United States Patent
Kobayashi et al.

(10) Patent No.: US 12,546,376 B2
(45) Date of Patent: Feb. 10, 2026

(54) SHOCK ABSORBER

(71) Applicant: KYB Corporation, Tokyo (JP)

(72) Inventors: Yasunori Kobayashi, Tokyo (JP); Kenshirou Anai, Tokyo (JP)

(73) Assignee: KYB Corporation, Tokyo (JP)

( * ) Notice: Subject to any disclaimer, the term of this patent is extended or adjusted under 35 U.S.C. 154(b) by 380 days.

(21) Appl. No.: 18/031,526

(22) PCT Filed: Nov. 30, 2021

(86) PCT No.: PCT/JP2021/043947
§ 371 (c)(1),
(2) Date: Apr. 12, 2023

(87) PCT Pub. No.: WO2022/149375
PCT Pub. Date: Jul. 14, 2022

(65) Prior Publication Data
US 2023/0375065 A1    Nov. 23, 2023

(30) Foreign Application Priority Data
Jan. 8, 2021    (JP) .................................. 2021-001804

(51) Int. Cl.
*F16F 9/36*    (2006.01)
*F16F 9/19*    (2006.01)
*F16F 9/32*    (2006.01)

(52) U.S. Cl.
CPC .............. *F16F 9/19* (2013.01); *F16F 9/3214* (2013.01); *F16F 9/36* (2013.01)

(58) Field of Classification Search
CPC .... F16F 9/19; F16F 9/3214; F16F 9/36; F16F 9/362; F16F 9/363
(Continued)

(56) References Cited

U.S. PATENT DOCUMENTS 4,386,686 A * 6/1983 Miura .................... F16F 9/364
188/322.17
6,253,661 B1   7/2001 Fenn et al.
(Continued)

FOREIGN PATENT DOCUMENTS

CN    105190084 A    12/2015
CN    111788408 A    10/2020
(Continued)

OTHER PUBLICATIONS

May 7, 2024, Japanese Office Action issued for related JP Application No. 2021-001804.
(Continued)

*Primary Examiner* — Thomas W Irvin
(74) *Attorney, Agent, or Firm* — Paratus Law Group, PLLC

(57) ABSTRACT

A shock absorber in the present invention includes: a cylinder; a rod guide fitted to the inner circumference of an end portion of the cylinder; a piston rod movably inserted into the cylinder; a piston connected to the piston rod; and a seal member stacked on the rod guide and through which the piston rod is inserted, wherein the seal member includes: an annular seal case having an annular concave portion on the inner circumference; a seal ring including a base portion and a lip and accommodated in the annular concave portion; an annular seal holder stacked on the rod guide side of the base portion, accommodated in the annular concave portion, and supporting the outer circumference of the seal ring to suppress the diameter enlargement of the lip; and a stopper mounted on the seal case and preventing the seal holder and the seal ring from falling off.

8 Claims, 12 Drawing Sheets

(58) Field of Classification Search
USPC .................................................. 188/322.17
See application file for complete search history.

(56) References Cited

U.S. PATENT DOCUMENTS

| | | | | |
|---|---|---|---|---|
| 8,418,820 B2* | 4/2013 | Kim | ............................ | F16F 9/49 |
| | | | | 188/322.22 |
| 9,291,229 B2* | 3/2016 | Shibahara | ................. | F16F 9/18 |
| 10,066,696 B2* | 9/2018 | Takeuchi | ................. | B60G 15/06 |
| 10,626,948 B2* | 4/2020 | Takeuchi | ................. | F16F 9/362 |
| 11,384,811 B2* | 7/2022 | Mori | ................. | F16F 9/3221 |
| 11,536,346 B2* | 12/2022 | Cho | ............................ | F16F 9/19 |
| 11,927,243 B2* | 3/2024 | Yamashita | ................. | F16F 9/36 |
| 11,988,265 B2* | 5/2024 | Nakagawa | ................. | F16F 9/19 |
| 2007/0051574 A1* | 3/2007 | Keil | ........................ | F16F 9/364 |
| | | | | 188/322.18 |
| 2008/0179149 A1 | 7/2008 | Strong | | |
| 2015/0316119 A1 | 11/2015 | Lehnen et al. | | |
| 2019/0226548 A1 | 7/2019 | Miwa et al. | | |
| 2021/0140507 A1 | 5/2021 | Cho et al. | | |
| 2023/0304559 A1* | 9/2023 | Kurihara | ................... | F16F 9/19 |

FOREIGN PATENT DOCUMENTS

| | | |
|---|---|---|
| DE | 102014225179 A1 | 3/2016 |
| JP | H03-026846 A | 3/1991 |
| JP | 2019-158068 A | 9/2019 |
| WO | WO 2018/056099 A1 | 3/2018 |

OTHER PUBLICATIONS

Jan. 11, 2022, Translation of International Search Report issued for related PCT Application No. PCT/JP2021/043947.
Apr. 15, 2025, Chinese Office Action issued for related CN Application No. 202180073187.6.
Oct. 22, 2024, Japanese Office Action issued for related JP Application No. 2021-001804.

* cited by examiner

SHOCK ABSORBER

CROSS REFERENCE TO PRIOR APPLICATION

This application is a National Stage Patent Application of PCT International Patent Application No. PCT/JP2021/043947 (filed on Nov. 30, 2021) under 35 U.S.C. § 371, which claims priority to Japanese Patent Application No. 2021-001804 (filed on Jan. 8, 2021), which are all hereby incorporated by reference in their entirety.

TECHNICAL FIELD

The present invention relates to a shock absorber.

BACKGROUND ART

A shock absorber is used, for example, by being interposed between a vehicle body and a wheel of a vehicle in the vehicle and suppresses vibrations of the vehicle body and the wheel by a damping force generated during extension and contraction.

As disclosed in JP 2019-158068 A, the shock absorber includes, for example, a cylinder, an annular rod guide fitted to the inner circumference of an end portion of the cylinder, a piston rod inserted through the inner circumference of the rod guide and movably inserted into the cylinder, and a piston connected to the piston rod and inserted into the cylinder to partition the inside of the cylinder into an extension side chamber and a compression side chamber that are filled with hydraulic oil, and further includes a seal unit that seals the outer circumference of the piston rod to prevent leakage of the hydraulic oil from the inside of the cylinder.

Specifically, the seal unit is stacked on the atmosphere side of the rod guide, and includes an annular seal holding member having a seal accommodation portion formed by a concave portion whose inner diameter becomes large partway on the inner circumference on the rod guide side, a seal member accommodated on the back side of the seal accommodation portion and sealing the outer circumference of the piston rod, and an annular seal holder accommodated on the front side of the seal accommodation portion and supporting the outer circumference of the seal member to suppress the diameter enlargement of the seal member. In the shock absorber configured as described above, since the seal member is backed up by the seal holder to tighten the piston rod, good sealing performance can be obtained.

CITATION LIST

Patent Literature

Patent Literature 1: JP 2019-158068 A

SUMMARY OF INVENTION

Technical Problem

In a step of assembling a conventional shock absorber, the seal member and the seal holder are installed to the seal holding member in advance to assemble a seal unit, and then a dust seal, the seal unit, and the rod guide are sequentially mounted on the outer circumference of the piston rod, and then the piston is mounted on the distal end of the piston rod to assemble a piston rod assembly. The piston rod assembly completed as described above is inserted into the cylinder and mounted on the cylinder by crimping the end portion of the cylinder.

However, since the seal member and the seal holder of the seal unit are merely inserted into the seal accommodation portion of the seal holding member, there is a case where the seal member and the seal holder fall off from the seal accommodation portion to the outside when the piston rod assembly is assembled or when the piston rod assembly is inserted into the cylinder, and there is a possibility that, if the assembly of the shock absorber is completed without noticing the falling-off, the seal member and the seal holder are installed in a state where they are not accommodated in a correct posture in the seal accommodation portion of the seal holding member.

In such a situation, it may be pointed out that the seal member cannot tighten the piston with a uniform tightening force over the entire circumference of the piston rod, and stable air tightness performance (sealing performance) cannot be obtained.

Therefore, an object of the present invention is to provide a shock absorber capable of suppressing deterioration of a seal ring and exhibiting stable sealing performance.

In order to solve the above problems, a shock absorber according to the present invention includes: a cylinder; an annular rod guide fitted to the inner circumference of an end portion of the cylinder; a piston rod inserted through the inner circumference of the rod guide and movably inserted into the cylinder; a piston connected to the piston rod and inserted into the cylinder to partition the inside of the cylinder into an extension side chamber and a compression side chamber that are filled with a working fluid; and a seal member that is annular, is stacked on a side of the rod guide opposite to the piston, is fitted to the inner circumference of the end portion of the cylinder, and has an inner circumference through which the piston rod is inserted, wherein the seal member includes: an annular seal case having an annular concave portion on the inner circumference on the rod guide side; a seal ring having an annular base portion and an annular lip rising from the inner circumference of the base portion toward the rod guide side and slidably contacting the outer circumference of the piston rod, and accommodated in the annular concave portion; an annular seal holder stacked on the rod guide side of the base portion of the seal ring, accommodated in the annular concave portion, and supporting the outer circumference of the lip to suppress the diameter enlargement of the lip; and a stopper mounted on the seal case and abutting on a surface of the seal holder on the rod guide side to prevent the seal holder and the seal ring from falling off.

According to the shock absorber configured as described above, since the stopper prevents the seal ring and the seal holder from falling off from the annular concave portion of the seal holder, the seal ring and the seal holder can maintain the state where they are installed to the seal case in a correct posture even if vibration acts on the seal member during conveyance of the piston rod assembly including the piston rod and the seal member installed thereto.

DESCRIPTION OF EMBODIMENTS

Figure 1:
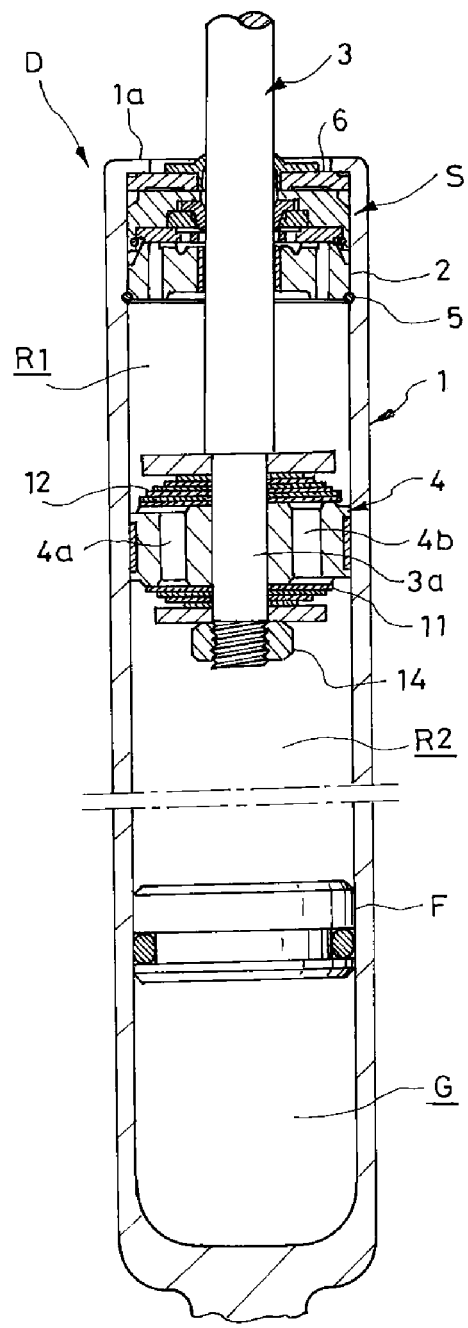
FIG. 1 is a longitudinal cross-sectional view of a shock absorber according to an embodiment.
Figure 2:
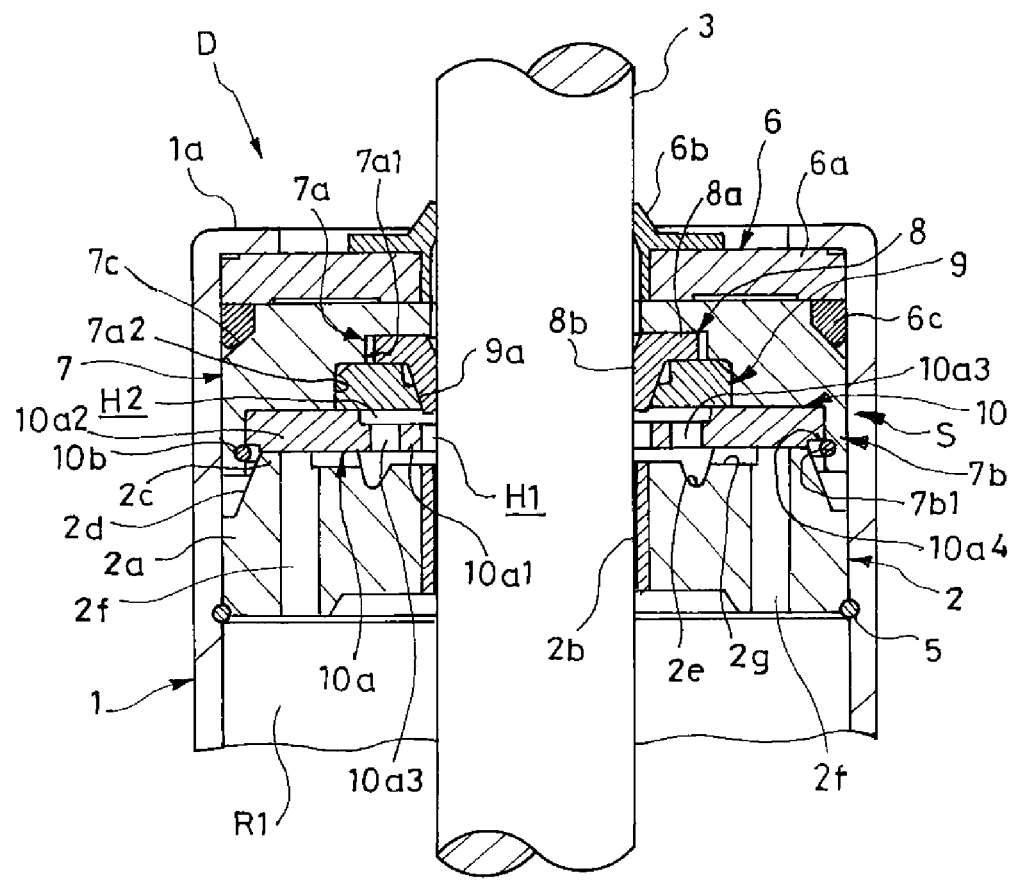
FIG. 2 is a partially enlarged longitudinal cross-sectional view of the shock absorber according to the embodiment.

Hereinafter, the present invention will be described based on the embodiments illustrated in the drawings. As illustrated in FIGS. 1 and 2, a shock absorber D according to an embodiment includes a cylinder 1, an annular rod guide 2 provided at an end portion of the cylinder 1, a piston rod 3 inserted through the inner circumference of the rod guide 2 and movably inserted into the cylinder 1, and a piston 4 connected to the piston rod 3 and inserted into the cylinder 1 to partition the inside of the cylinder 1 into an extension side chamber R1 and a compression side chamber R2 that are filled with working fluid, and a seal member S that is annular, is stacked on a side of the rod guide 2 opposite to the piston, is fitted to the inner circumference of the end portion of the cylinder, and has an inner circumference through which the piston rod 3 is inserted. In the case of the shock absorber D, the shock absorber D is used by being interposed between a vehicle body and a wheel in a vehicle (not illustrated) and suppresses vibrations of the vehicle body and the wheel.

Hereinafter, each portion of the shock absorber D will be described in detail. As illustrated in FIG. 1, an annular rod guide 2 is mounted on the upper end of the cylinder 1 in FIG. 1. A piston rod 3 is inserted through the inner circumference of the rod guide 2, and the rod guide 2 guides the relative movement of the piston rod 3 in the vertical direction in FIG. 1, which is the axial direction with respect to the cylinder 1.

The rod guide 2 includes an annular main body 2a fitted into the cylinder 1, a tubular bush 2b mounted on the inner circumference of the main body 2a and slidably contacting the outer circumference of the piston rod 3, an annular convex portion 2c protruding to a side of the main body 2a opposite to the piston from a radially intermediate portion of the upper end of the side of the main body 2a opposite to the piston in FIG. 2, an annular concave portion 2d provided from the outer circumference of the convex portion 2c to the outer circumference of the main body 2a, an annular groove 2e provided on the inner circumferential side of the convex portion 2c of the main body 2a, a through hole 2f penetrating from the end of the main body 2a on the piston side to the end portion of the convex portion 2c, and a notch 2g provided in the convex portion 2c and leading from the inner circumference of the convex portion 2c to the through hole 2f.

When the rod guide 2 configured as described above is inserted into the cylinder 1, movement of the rod guide 2 to the lower side in FIG. 1 that is the piston 4 side is regulated by the C ring 5 mounted on the inner circumference of the cylinder 1. The seal member S and a dust seal member 6 are stacked on the atmosphere side that is the side of the rod guide 2 opposite to the piston, and the rod guide 2, the seal member S, and the dust seal member 6 are fixed to the cylinder 1 while being sandwiched between a crimped portion 1a formed on the cylinder 1 by crimping a pipe end of the cylinder 1 and the above-described C ring 5.

Next, the piston rod 3 is inserted through the inner circumference of the rod guide 2 as described above. The piston rod 3 includes, at the distal end, a small-diameter portion 3a to which the piston 4, an extension side damping valve 11, and a compression side damping valve 12 are mounted. A piston nut 14 is screwed to the distal end of the small-diameter portion 3a, and the piston 4, the extension side damping valve 11, and the compression side damping valve 12 are fixed to the piston rod 3 by the piston nut 14.

As described above, the piston 4 is mounted on the distal end of the piston rod 3 and slidably inserted into the cylinder 1, and partitions the inside of the cylinder 1 into the extension side chamber R1, facing the rod guide 2, above the piston 4 in FIG. 1 and the compression side chamber R2 below the piston 4 in FIG. 1. The extension side chamber R1 and the compression side chamber R2 are filled with a working fluid such as hydraulic oil. In addition to the hydraulic oil, the working fluid may be, for example, a liquid such as water or an aqueous solution, an electroviscous fluid, a magneto-viscous fluid, or a gas.

The piston 4 includes an extension side passage 4a and a compression side passage 4b allowing the extension side chamber R1 and the compression side chamber R2 to communicate with each other. The extension side damping valve 11 is stacked on the lower side of the piston 4 in FIG. 1 to open and close the lower end of the extension side passage 4a in FIG. 1, and the compression side damping valve 12 is stacked on the upper side of the piston 4 in FIG. 1 to open and close the upper end of the compression side passage 4b in FIG. 1. Both the extension side damping valve 11 and the compression side damping valve 12 are stacked leaf valves formed by stacking a plurality of leaf valves made of annular plates, but are not limited thereto as long as they can generate a damping force. In an extension stroke of the shock absorber D in which the piston rod 3 moves to the upper side in FIG. 1 with respect to the cylinder 1, the extension side damping valve 11 opens for the flow of the hydraulic oil passing through the extension side passage 4a from the extension side chamber R1 compressed by the piston 4 toward the compression side chamber R2 expanded by the piston 4, while giving resistance to the flow. In a contraction stroke of the shock absorber D in which the piston rod 3 moves to the lower side in FIG. 1 with respect to the cylinder 1, the compression side damping valve 12 opens for the flow of the hydraulic oil passing through the compression side passage 4b from the compression side chamber R2 compressed by the piston 4 toward the extension side chamber R1 expanded by the piston 4, while giving resistance to the flow.

The lower end of the cylinder 1 in FIG. 1 is closed and includes a bracket connecting the shock absorber D to the vehicle body or the wheel side although not illustrated in detail. In the cylinder 1, a free piston F partitioning the cylinder 1 into a gas chamber G is slidably inserted below the compression side chamber R2.

When the shock absorber D extends, the extension side damping valve 11 gives resistance to the flow of the hydraulic oil from the compressed extension side chamber R1 toward the expanded compression side chamber R2, and the shock absorber D generates a damping force that hinders the extension. In addition, in the extension stroke of the shock absorber D, since the piston rod 3 is retracted from the inside of the cylinder 1, the free piston F moves to the upper side in FIG. 1 by an amount corresponding to the volume of the piston rod 3 retracted from the inside of the cylinder 1 to expand the gas chamber G, thereby compensating for the volume of the piston rod 3 retracted from the inside of the cylinder 1.

On the contrary, when the shock absorber D contracts, the compression side damping valve 12 gives resistance to the flow of the hydraulic oil from the compressed compression side chamber R2 toward the expanded extension side chamber R1. In addition, during the contraction of the shock absorber D, since the piston rod 3 enters the cylinder 1, the free piston F moves to the lower side in FIG. 1 by an amount corresponding to the volume of the piston rod 3 entering the cylinder 1 to reduce the gas chamber G, thereby compensating the volume of the piston rod 3 entering the cylinder 1. Therefore, when the shock absorber D is in the contraction stroke, the compression side damping valve 12 gives resistance to the flow of the hydraulic oil described above, so that the shock absorber D generates a compression side damping force that hinders contraction.

The shock absorber D may be provided with a bypass path that bypasses the extension side damping valve 11 and the compression side damping valve 12 and allows the extension side chamber R1 and the compression side chamber R2 to communicate with each other, and a damping force adjustment valve arranged in the bypass path, so that the extension side damping force and the compression side damping force of the shock absorber D can be adjusted to be higher or lower. In addition, in a case where the working fluid of the shock absorber D is an electroviscous fluid, a magneto-viscous fluid, or an electromagnetic viscous fluid, an electric field generation source that applies an electric field or a magnetic field generation source that applies a magnetic field to a passage allowing the extension side chamber R1 and the compression side chamber R2 to communicate with each other may be used as the damping force generation source, instead of the extension side damping valve 11 and the compression side damping valve 12. Therefore, the configuration related to damping force generation of the shock absorber D can be modified in any manner.

In the above description, the compensation of the volume of the piston rod 3 moving into and out of the cylinder 1 is performed by providing the free piston F in the cylinder 1 to form the gas chamber G; however, the volume may be compensated by providing a reservoir tank communicating with the compression side chamber R2 outside the cylinder 1. In this case, a base valve that gives resistance to the flow of the hydraulic oil from the compression side chamber R2 toward the reservoir tank may be provided between the compression side chamber R2 and the reservoir tank, so that the base valve contributes to the generation of the compression side damping force.

Next, the seal member S is annular, is stacked on the atmosphere side that is the side of the rod guide 2 opposite to the piston, is fitted to the inner circumference of the end portion of the cylinder 1, and has an inner circumference through which the piston rod 3 is inserted.

Figure 3:
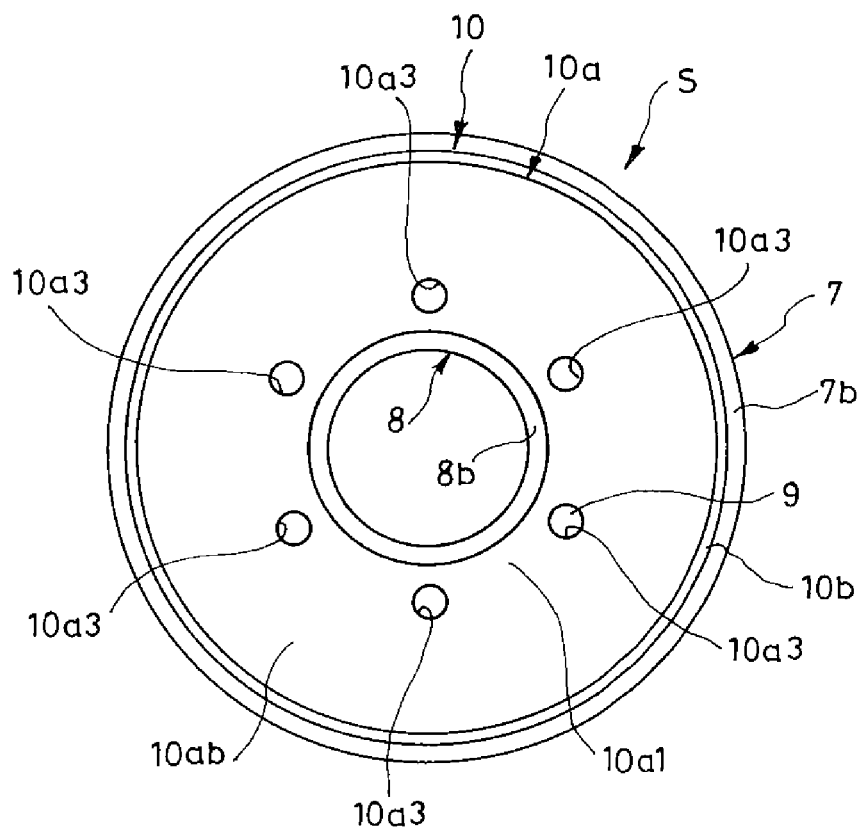
FIG. 3 is an enlarged bottom view of a seal member of the shock absorber according to the embodiment.

Specifically as illustrated in FIGS. 2 and 3, the seal member S includes an annular seal case 7 having an annular concave portion 7a on the inner circumference on the rod guide 2 side, a seal ring 8 accommodated in the annular concave portion 7a, an annular seal holder 9 accommodated in the annular concave portion 7a and supporting the outer circumference of a lip 8b of the seal ring 8, and a stopper 10 mounted on the seal case 7 and preventing the seal holder 9 and the seal ring 8 from falling off.

The seal case 7 is annular, and includes an annular concave portion 7a provided on the inner circumference of the end on the rod guide 2 side that is the lower end in FIG. 2 and an annular socket 7b provided on the outer circumference of the lower end in FIG. 2. The annular concave portion 7a is a stepped annular concave portion in which the inner diameter on the rod guide 2 side is enlarged partway, and includes a small-diameter concave portion 7a1 on the back side and a large-diameter concave portion 7a2 on the front side when viewed from the rod guide 2 side.

The socket 7b rises toward the rod guide 2 side from the outer circumference of the seal case 7 of the end portion on the rod guide 2 side, and includes an annular groove 7b1 on the inner circumference. The seal case 7 further includes an annular concave portion 7c on the outer circumference of the upper end in FIG. 2 on the side opposite to the rod guide.

The seal ring 8 is made of synthetic resin or rubber, includes an annular base portion 8a and the annular lip 8b rising from the inner circumference of the base portion 8a toward the rod guide 2 and slidably contacting the outer circumference of the piston rod 3, and is accommodated in the annular concave portion 7a of the seal case 7. In the present embodiment, the seal ring 8 is made of fluororubber. More specifically, the thickness that is the axial height of the base portion 8a of the seal ring 8, is longer than the axial length of the small-diameter concave portion 7a1 of the annular concave portion 7a, and the outer diameter of the base portion 8a is slightly small so as to be fittable to the inner circumference of the small-diameter concave portion 7a1.

When the seal ring 8 is accommodated in the annular concave portion 7a of the seal case 7, the seal ring 8 is accommodated in the annular concave portion 7a in a state where the base portion 8a is inserted into the small-diameter concave portion 7a1. The inner diameter of the lip 8b is smaller than the outer diameter of the piston rod 3 and has a fastening allowance. When the seal ring 8 is mounted on the outer circumference of the piston rod 3, the seal ring 8 tightens the outer circumference of the piston rod 3 with a predetermined tightening force at the lip 8b to slidably contact the outer circumference of the piston rod 3 and seal the outer circumference of the piston rod 3.

In the present embodiment, the seal holder 9 is made of acrylonitrile-butadiene rubber, is annular, and is accommodated in the annular concave portion 7a of the seal case 7. More specifically, the seal holder 9 includes an annular holding portion 9a protruding from the inner circumference on the rod guide 2 side to the inner circumferential side in the radial direction. In addition, the axial height of the seal holder 9 is equal to the axial height of the large-diameter concave portion 7a2 of the annular concave portion 7a, and the outer diameter is substantially equal to the inner diameter of the large-diameter concave portion 7a2. The seal holder 9 is accommodated in the annular concave portion 7a by being fitted into the large-diameter concave portion 7a2 of the annular concave portion 7a and causes the end surface on the side opposite to the rod guide to abut on the end surface of the base portion 8a of the seal ring 8 on the rod guide side. In addition, the inner diameter of the holding portion 9a of the seal holder 9 is smaller than the outer diameter of the lip 8b at the place where the holding portion 9a abuts in a state where the piston rod 3 is inserted on the inner circumferential side, and when the seal holder 9 is fitted into the large-diameter concave portion 7a2, the holding portion 9a supports the outer circumference of the lip 8b. When the piston rod 3 is inserted through the inner circumference of the lip 8b, the holding portion 9a supports the outer circumference of the lip 8b to suppress the diameter enlargement of the lip 8b, so that the lip 8b comes in close contact with the outer circumference of the piston rod 3. As described above, the seal holder 9 supports the lip 8b of the seal ring 8 from the outer circumferential side, suppresses the diameter enlargement of the lip 8b fitted to the outer circumference of the piston rod 3, and stabilizes the surface pressure of the portion where the lip 8b contacts the piston rod 3. The seal ring 8 withstands high temperatures and exhibits good sealing performance because it is made of fluoro-rubber, but is slightly inferior in terms of cold resistance. However, in the shock absorber D of the present embodiment, since the seal ring 8 is backed up by the seal holder 9 made of acrylonitrile-butadiene rubber having excellent cold resistance, good sealing performance can be obtained in a wide temperature range from a high temperature to a low temperature. As described above, when the seal ring 8 is made of a synthetic resin or rubber material exhibiting good sealing performance even at a high temperature, and the seal holder 9 is made of a synthetic resin or rubber that is a material having excellent cold resistance, good sealing performance can be obtained in a wide temperature range from a high temperature to a low temperature. However, the seal ring 8 and the seal holder 9 may be made of the same synthetic resin or rubber.

The stopper 10 includes a plate 10a that is annular and is fitted to the inner circumference of the socket 7b to abut on the seal holder 9, and a C-shaped retaining ring 10b as a fixing member mounted on the socket 7b and fixing the plate 10a to the seal case 7.

The plate 10a includes an inner circumferential portion 10a1 having an inner diameter larger than the outer diameter of the piston rod 3 and forming an annular gap H1 with the piston rod 3 while facing the seal holder 9 and forming an annular gap H2 with the seal holder 9, an outer circumferential portion 10a2 connected to the outer circumference of the inner circumferential portion 10a1, abutting on the seal holder 9, and fitted to the inner circumference of the socket 7b, six through holes 10a3 provided at equal intervals on the same circumference of the intermediate portion of the inner circumferential portion 10a1 and penetrating the inner circumferential portion 10a1, and a chamfered portion 10a4 provided on the outer circumference of the outer circumferential portion 10a2 on the rod guide side.

The plate 10a configured as described above is installed to the seal case 7 by fitting the outer circumference to the inner circumference of the socket 7b, and is fixed to the seal case 7 by the retaining ring 10b mounted on the annular groove 7b1 provided on the inner circumference of the socket 7b. When the plate 10a is inserted into the socket 7b in the correct orientation, the chamfered portion 10a4 faces the annular groove 7b1 of the socket 7b, allowing the retaining ring 10b to be mounted on the annular groove 7b1. That is, the length from the upper end of the plate 10a to the chamfered portion 10a4 is equal to or slightly shorter than the length from the abutment surface of the seal case 7 on the plate 10a to the annular groove 7b1 of the socket 7b. Therefore, when the plate 10a is fitted into the socket 7b with the front and back sides (the upper and lower sides in FIG. 2) reversed, the outer circumference of the plate 10a faces the annular groove 7b1, making it impossible to mount the retaining ring 10b on the annular groove 7b1.

When the plate 10a is fixed to the seal case 7, the seal holder 9 abutting on the outer circumferential portion 10a2 of the plate 10a does not come off from the large-diameter concave portion 7a2 of the annular concave portion 7a. Then, the seal ring 8 in which the base portion 8a abuts on the seal holder 9 also does not come off from the small-diameter concave portion 7a1 of the annular concave portion 7a. Therefore, when the stopper 10 including the plate 10a and the retaining ring 10b is mounted on the seal case 7, the seal ring 8 and the seal holder 9 are integrated in a state where they are prevented from falling off from the annular concave portion 7a of the seal case 7. Since the base portion 8a is sandwiched between the seal holder 9 and the seal case 7 while being compressed in the axial direction, the seal ring 8 energizes the seal holder 9 from the seal case 7 toward the rod guide side, but the seal holder 9 does not fall off from the seal case 7 because it is fixed by the stopper 10.

Then, as described above, when the seal ring 8, the seal holder 9, and the stopper 10 are installed to the seal case 7, the seal case 7, the seal ring 6, the seal holder 9, and the stopper 10 integrally form the seal member S that is a seal assembly.

The dust seal member 6 is stacked on the atmosphere side of the seal member S, which is the side opposite to the piston. The dust seal member 6 includes a core metal 6a formed of an annular plate, an annular dust seal 6b integrated with the inner circumference of the core metal 6a on the atmosphere side opposite to the rod guide side and slidably contacting the outer circumference of the piston rod 3, and an annular outer circumferential seal 6c integrated with the outer circumference of the core metal 6a on the rod guide side.

When the dust seal member 6 is inserted into the cylinder 1 in a state where the core metal 6a is stacked on the end of the seal case 7 of the seal member S on the side opposite to the rod guide, the outer circumferential seal 6c is accommodated in the concave portion 7c of the seal case 7 in a compressed state, and comes in close contact with the concave portion 7c of the seal case 7 and the inner circumference of the cylinder 1 to seal a gap between the seal member S and the cylinder 1. In addition, the dust seal member 6 causes the dust seal 6b to slidably contact the outer circumference of the piston rod 3 to prevent dust, water, mud, and the like from entering the cylinder 1 from the outer circumference of the piston rod 3.

The shock absorber D configured as described above is assembled by a procedure described below. First, the seal ring 8, the seal holder 9, and the stopper 10 are installed to the seal case 7, as described above, to assemble the seal member S.

Next, the piston rod 3 is sequentially inserted into the inner circumferences of the dust seal member 6, the seal member S, and the rod guide 2 from the distal end side, and the dust seal member 6, the seal member S, and the rod guide 2 are installed to the piston rod 3.

Finally, the compression side damping valve 12, the piston 4, and the extension side damping valve 11 are sequentially installed to the small-diameter portion 3a at the distal end of the piston rod 3, and fixed to the piston rod 3 with the piston nut 14.

In this manner, the piston 4, the extension side damping valve 11, the compression side damping valve 12, the rod guide 2, the seal member S, and the dust seal member 6 are installed to the piston rod 3 as described above to obtain a piston rod assembly.

Next, the piston rod assembly is inserted into the cylinder 1 from the piston 4 side, and when the piston 4 and the compression side damping valve 12 are completely put into the cylinder 1, the C ring 5 is mounted on the inner circumference of the open end of the cylinder 1. Subsequently, the piston rod assembly is further inserted into the cylinder 1 to cause the rod guide 2 to abut on the C ring 5, and to put the rod guide 2, the seal member S, and the dust seal member 6 into the cylinder 1 in a stacked state.

After the rod guide 2, the seal member S, and the dust seal member 6 are put into the cylinder 1 in a stacked state while causing the rod guide 2 to abut on the C ring 5, the open end of the cylinder 1 is crimped by crimping, so that the rod guide 2, the seal member S, and the dust seal member 6 are sandwiched between the crimped portion 1a and the C ring 5 to be fixed to the cylinder 1. The injection of the working fluid into the extension side chamber R1 and the compression side chamber R2 may be performed into a step of inserting the piston rod assembly into the cylinder 1, or may be performed after this step and before crimping the cylinder 1. The injection of gas into the gas chamber G is performed, for example, from the lower end of the cylinder 1 after the piston rod assembly is assembled to the cylinder 1, and the bracket is attached to the lower end of the cylinder 1 after the gas injection. The assembly step of the shock absorber D is an example and can be changed.

In the shock absorber D assembled as described above, the seal member S includes: the annular seal case 7 having the annular concave portion 7a on the inner circumference on the rod guide side; a seal ring 8 having an annular base portion 8a and an annular lip 8b rising from the inner circumference of the base portion 8a toward the rod guide side and slidably contacting the outer circumference of the piston rod 3, and accommodated in the annular concave portion 7a; the annular seal holder 9 stacked on the rod guide side of the base portion 8a of the seal ring 8, accommodated in the annular concave portion 7a, and supporting the outer circumference of the seal ring 8 to suppress the diameter enlargement of the lip 8b; and a stopper 10 mounted on the seal case 7 and abutting on a surface of the seal holder 9 on the rod guide side to prevent the seal holder 9 and the seal ring 8 from falling off.

Therefore, when the piston rod assembly is assembled by installing the seal member S to the outer circumference of the piston rod 3 or when the piston rod assembly is inserted into the cylinder 1, the seal ring 8 and the seal holder 9 do not fall off from the seal case 7 and are maintained in a state where they are accommodated in a correct assembling posture in the annular concave portion 7a.

Even when the piston rod assembly is installed to the cylinder 1, the seal ring 8 and the seal holder 9 of the seal member S are assembled in the state where they are accommodated in the correct posture in the annular concave portion 7a of the seal case 7.

Therefore, the seal ring 8 can be positioned at an appropriate position with respect to the piston rod 3, slidably contact the outer circumference of the piston rod 3, and tighten the entire circumference of the piston rod 3 with a uniform tightening force, and the shock absorber D can exhibit stable sealing performance even if the piston rod 3 moves up and down.

As described above, the seal member S is fixed to the cylinder 1 while being sandwiched between the crimped portion 1a of the cylinder 1 and the C ring 5 together with the rod guide 2 and the dust seal member 6. At this time, since the socket 7b is accommodated in the concave portion 2d on the outer circumference of the rod guide 2, the plate 10a abuts on the convex portion 2c of the rod guide 2 and is fixed to the cylinder 1 while being pressed against the seal case 7 by the axial force received from the crimped portion 1a. Since the plate 10a abuts on the outer circumference of the seal holder 9, the axial force is also applied to the seal holder 9, and the seal holder 9 does not fall off from the large-diameter concave portion 7a2 even if the lip 8b of the seal ring 8 is enlarged in diameter and a force to push the seal holder 9 out of the large-diameter concave portion 7a2 is applied. The annular concave portion 7a may be formed as an annular concave portion whose inner diameter is not enlarged partway and does not change; however, when the annular concave portion 7a includes the small-diameter concave portion 7a1 accommodating the base portion 8a of the seal ring 8 and the large-diameter concave portion 7a2 accommodating the seal holder 9, the seal holder 9 does not excessively press the base portion 8a of the seal ring 8 under the axial force received from the plate 10a, thus making it possible to protect the seal ring 8.

In addition, the inner diameter of the plate 10a of the stopper 10 is larger than the outer diameter of the piston rod 3, and thus the plate 10a does not interfere with the piston rod 3, but the inner circumferential portion 10a1 faces the seal holder 9 via the gap H2. As described above, the plate 10a is pressed by the axial force and fixed to the cylinder 1. For this reason, even if the seal holder 9 is deformed to be lifted from the seal case 7 due to the insertion of the lip 8b into the piston rod 3, the plate 10a can support the seal holder 9, thus making it possible to maintain the sealing performance of the piston rod 3 by the lip 8b. Furthermore, even if the inner circumference of the seal holder 9 abuts on the plate 10a due to such deformation of the seal holder 9, the Gap H2 is always maintained in a state of being communicated with the extension side chamber R1 via the through hole 2f of the rod guide 2 by the through hole 10a3 provided in the inner circumferential portion 10a1 of the plate 10a; therefore, it is possible to cause a high pressure in the extension side chamber R1 compressed during the extension operation of the shock absorber D to act on the seal holder 9 to increase the tightening force for tightening the piston rod 3 with the lip 8b of the seal ring 8. In addition, it is possible to cause a high pressure in the extension side chamber R1 to act also on the lip 8b via the annular gap H1 between the plate 10a and the piston rod 3. Therefore, even during the extension operation of the shock absorber D in which the extension side chamber R1 has a high pressure, it is possible to cause the pressure in the extension side chamber R1 to act on the seal ring 8 and the seal holder 9 to effectively prevent the leakage of the working fluid from the cylinder 1. The number of the through holes 10a3 provided in the plate 10a may be one or more, and can be arbitrarily set.

In addition, if the working fluid contains contaminants such as cutting chips generated during machining of the shock absorber D, the working fluid containing the contaminants may be fed into the gap between the plate 10a and the rod guide 2 through the through hole 2f during the extension operation of the shock absorber D. In such a case, it is possible to prevent the contaminants from returning to the extension side chamber R1 and the compression side chamber R2 by trapping the contaminants into the annular groove 2e of the rod guide 2, and it is possible to collect the contaminants from the extension side chamber R1 and the compression side chamber R2 and purify the hydraulic oil in the extension side chamber R1 and the compression side chamber R2 by repeating the extension/contraction operation of the shock absorber D.

As described above, the shock absorber D according to the present embodiment includes: the cylinder 1; the annular rod guide 2 fitted to the inner circumference of the end portion of the cylinder 1; the piston rod 3 inserted through the inner circumference of the rod guide 2 and movably inserted into the cylinder 1; the piston 4 connected to the piston rod 3 and inserted into the cylinder 1 to partition the inside of the cylinder 1 into the extension side chamber R1 and the compression side chamber R2 that are filled with a working fluid; and the seal member S that is annular, is stacked on the side of the rod guide 2 opposite to the piston, is fitted to the inner circumference of the end portion of the cylinder 1, and has the inner circumference through which the piston rod 3 is inserted, wherein the seal member S includes: the annular seal case 7 having the annular concave portion 7a on the inner circumference on the rod guide side; the seal ring 8 having the annular base portion 8a and the annular lip 8b rising from the inner circumference of the base portion 8a toward the rod guide side and slidably contacting the outer circumference of the piston rod 3, and accommodated in the annular concave portion 7a; the annular seal holder 9 stacked on the rod guide side of the base portion 8a of the seal ring 8, accommodated in the annular concave portion 7a, and supporting the outer circumference of the seal ring 8 to suppress the diameter enlargement of the lip 8b; and the stopper 10 mounted on the seal case 7 and abutting on the surface of the seal holder 9 on the rod guide side to prevent the seal holder 9 and the seal ring 8 from falling off.

In the shock absorber D configured as described above, when the shock absorber D is assembled, the seal ring 8 and the seal holder 9 are maintained in a state where they are installed in a correct posture without falling off from the seal case 7 due to the stopper 10 of the seal member S. Therefore, according to the shock absorber D of the present embodiment, since the seal ring 8 and the seal holder 9 are maintained in the state where they are installed to the seal case 7 in the correct posture, the seal ring 8 can tighten the entire circumference of the piston rod 3 with a uniform tightening force, thus making it possible to exhibit stable sealing performance.

Furthermore, since the seal ring 8 and the seal holder 9 are maintained in the state where they are installed in the correct posture without falling off from the seal case 7 due to the stopper 10 of the seal member S, the seal member S can be separated from the rod guide 2 and the dust seal member 6 after the piston rod assembly is assembled, so that cutting chips or the like that causes contamination can be easily removed by blowing or vacuuming. Also, since the seal member S can hold the seal ring 8 and the seal holder 9 even if the rod guide 2 is not adjacent thereto, the dimensional accuracy is required only for the piston rod 3, and the dimensional accuracy is not required for the rod guide 2, thus reducing the processing accuracy requirements and also reducing the processing costs.

In the shock absorber D of the present embodiment, the seal case 7 has the annular socket 7b on the outer circumference on the rod guide side, and the stopper 10 includes the plate 10a that is annular, is fitted to the inner circumference of the socket 7b to abut on the seal holder 9, and has a larger inner diameter than the outer diameter of the piston rod 3, and the retaining ring (fixing member) 10b mounted on the socket 7b and fixing the plate 10a to the seal case 7. In the shock absorber D configured as described above, the plate 10a can be radially positioned by fitting the plate 10a to the socket 7b, and the plate 10a can be fixed to the seal case 7 with the retaining ring (fixing member) 10b using the socket 7b. Therefore, according to the shock absorber D configured as described above, the plate 10a can be fixed to the seal case 7 at an appropriate position, and the seal ring 8 and the seal holder 9 can be prevented from coming off. In addition, during the extension operation of the shock absorber D in which the extension side chamber R1 has a high pressure, it is possible to cause the pressure in the extension side chamber R1 to act on the seal ring 8 to effectively prevent the leakage of the working fluid from the cylinder 1.

Furthermore, in the shock absorber D configured as described above, the plate 10a includes the inner circumferential portion 10a1 facing the seal holder 9 and forming the annular gap H2 with the seal holder 9, the outer circumferential portion 10a2 connected to the outer circumference of the inner circumferential portion 10a1, abutting on the seal holder 9, and fitted to the inner circumference of the socket 7b, the one or more through holes 10a3 penetrating the inner circumferential portion 10a1, and the chamfered portion 10a4 provided on the outer circumference of the outer circumferential portion 10a2 on the rod guide side. According to the shock absorber D configured as described above, since the gap H2 formed between the plate 10a and the seal holder 9, the interference between the plate 10a and the lip 8b of the seal ring 8 is avoided, and an excessive tightening force is not given to the lip 8b, thus making it possible to suppress the deterioration of the seal ring 8 due to wear. In addition, according to the shock absorber D configured as described above, since the inner circumferential portion 10a1 of the plate 10a faces the seal holder 9 via the gap H2, the seal holder 9 can be supported by the inner circumferential portion 10a1 of the plate 10a even if the seal holder 9 is deformed to be lifted due to the diameter enlargement of the lip 8b of the seal ring 8, thus making it possible to maintain the tightening force of the lip 8b and exhibit good sealing performance. Also, since the plate 10a includes the through hole 10a3 and the high pressure in the extension side chamber R1 can act on the seal holder 9 during the extension operation of the shock absorber D in which the pressure in the extension side chamber R1 of the shock absorber D increases, the shock absorber D can effectively prevent the leakage of the working fluid from the cylinder 1 even during the extension operation.

In the shock absorber D of the present embodiment, since the fixing member is the retaining ring 10b mounted on the inner circumference of the socket 7b, the plate 10a can be fixed to the seal case 7 without making the axial length of the socket 7b long. Therefore, according to the shock absorber D in which the fixing member is the retaining ring 10b, the stroke length can be easily secured by suppressing the increase in the axial length of the seal member S. Furthermore, since the plate 10a includes the chamfered portion 10a4, when an operator who mounts the plate 10a on the seal case 7 installs the plate 10a with the front and back sides of the plate 10a reversed, the outer circumference of the plate 10a faces the annular groove 7b1 of the socket 7b and the retaining ring 10b cannot be mounted on the socket 7b, making it impossible to fix the plate 10a; therefore, it is possible to prevent erroneous assembly of the plate 10a to the seal case 7 with the front and back sides reversed.

Figure 4:
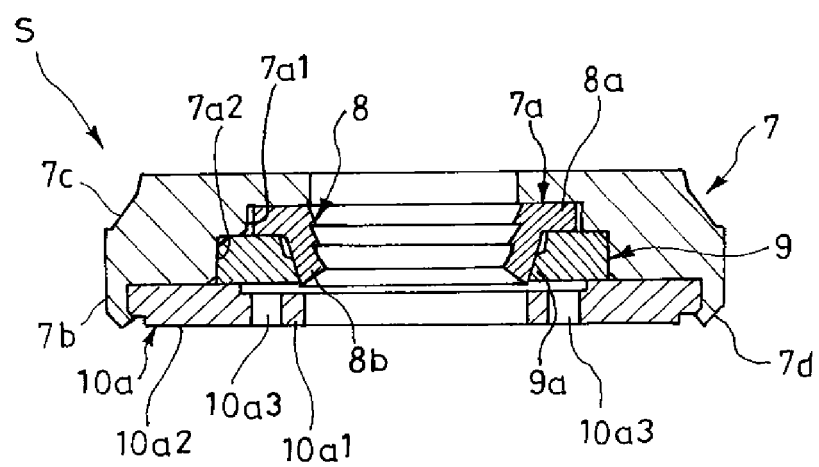
FIG. 4 is an enlarged longitudinal cross-sectional view of a modification of a fixing member in the seal member.
Figure 5:
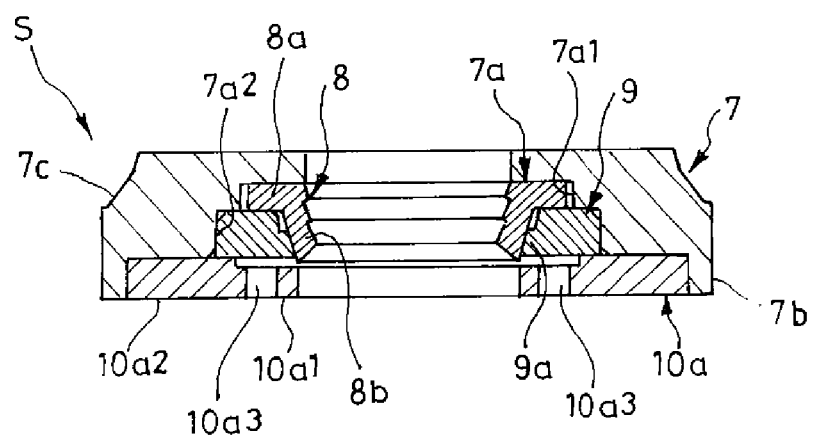
FIG. 5 is an enlarged longitudinal cross-sectional view of another modification of a fixing member in the seal member.

Since the retaining ring 10b is mounted on the socket 7b to fix the plate 10a, it is easy to fix the plate 10a to the seal case 7; however, as illustrated in FIG. 4, the plate 10a may be fixed to the seal case 7 by crimping the distal end of the socket 7b to the inner circumferential side in a state where the plate 10a is accommodated, instead of using the retaining ring 10b. In this case, the fixing member is a crimped portion 7d at the distal end of the socket 7b, and according to the shock absorber D configured as described above, the retaining ring 10b is not required, thus allowing the number of parts to be reduced. Furthermore, as illustrated in FIG. 5, the plate 10a may be fixed to the seal case 7 by press-fitting the plate 10a into the inner circumference of the socket 7b. In this case, the fixing member is the socket 7b, and according to the shock absorber D configured as described above, the retaining ring 10b is not required, thus allowing the number of parts to be reduced.

Figure 6:
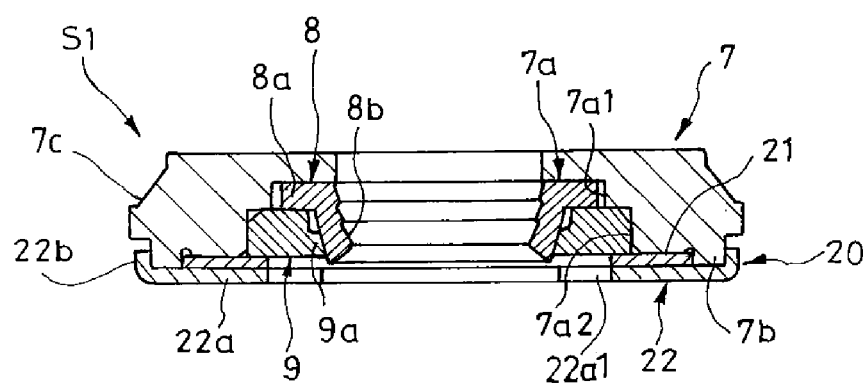
FIG. 6 is a partially enlarged longitudinal cross-sectional view of a shock absorber including a seal member having a stopper according to a first modification.
Figure 7:
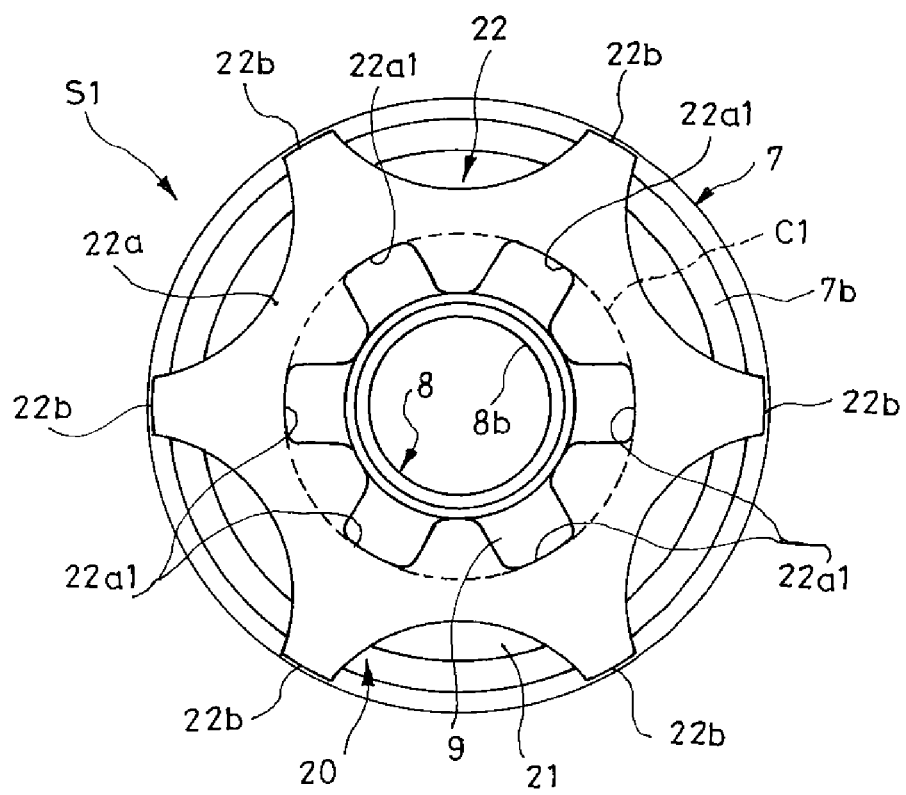
FIG. 7 is an enlarged bottom view of the shock absorber including the seal member having the stopper according to the first modification.

Alternatively, the stopper may be configured as in the modification illustrated below. As illustrated in FIGS. 6 and 7, a stopper 20 of a first modification includes a plate 21 that is annular, is fitted to the inner circumference of the socket 7b, abuts on the seal holder 9, and has a larger inner diameter than the outer diameter of the piston rod 3, and a fixing member 22 mounted on the socket 7b and fixing the plate 21 to the seal case 7.

The plate 21 is annular and is fitted to the inner circumference of the socket 7b. The socket 7b of the seal case 7 is annular, has a smaller outer diameter than the maximum cuter diameter of the seal case 7, protrudes from the seal case 7 to the piston side, and forms an annular gap with the cylinder 1.

The fixing member 22 includes a main body portion 22a that is annular and abuts on the surface of the plate 21 on the rod guide side, and six arms 22b provided on the outer circumference of the main body portion 22a and gripping the outer circumference of the socket 7b. The main body portion 22a has a larger inner diameter than the outer diameter of the piston rod 3, and includes six notches 22a1 opened from the inner circumference and formed toward the outer circumference. The inner diameter of the plate 21 is equal to or larger than the diameter of a circumscribed circle C1 in contact with the distal ends of the notches 22a1 and smaller than the outer diameter of the seal holder 9, and the plate 21 abuts on the surface of the seal holder 9 on the rod guide side when fitted to the inner circumference of the socket 7b.

The arm 22b of the fixing member 22 has a claw shape with a bent distal end portion when the fixing member 22 is viewed from the side, and tightens and grips the outer circumference of the socket 7b when fitted to the outer circumference of the socket 7b. Thus, the fixing member 22 can be fixed to the seal case 7 by fitting the arm 22b to the outer circumference of the socket 7b. The number of the arms 22b installed can be arbitrarily set as long as it is 3 or more. When three or more arms 22b are provided at equal intervals on the outer circumference of the main body portion 22a, the fixing member 22 can be fixed to the socket 7b without unevenness in the circumferential direction.

When the fixing member 22 is mounted on the seal case 7 as described above in a state where the plate 21 is fitted into the socket 7b of the seal case 7, the plate 21 is fixed to the seal case 7. Since the plate 21 is fixed to the seal case 7 while abutting on the outer circumferential side of the surface of the seal holder 9 on the rod guide side, the seal ring 8 and the seal holder 9 in the annular concave portion 7a are prevented from falling off from the seal case 7.

Since the outer diameter of the socket 7b is smaller than the inner diameter of the cylinder 1, the arm 22b of the fixing member 22 does not interfere with the cylinder 1 when the arm 22b grips the outer circumference of the socket 7b, thus allowing a seal member S1 to be easily inserted into the cylinder 1.

In addition, the thickness that is the axial length of the plate 21 of the stopper 20 of the first modification in the shock absorber D of the present embodiment, is shorter than the axial length of the socket 7b, and the axial length of the distal end portion of the arm 22b is also shorter than the axial length of the socket 7b; therefore, when the fixing member 22 is mounted on the socket 7b, the main body portion 22a of the fixing member 22 comes in close contact with the surface of the plate 21 on the rod guide side, thus allowing the plate 21 to be fixed to the seal case 7 without looseness.

In the seal member S1 configured as described above, since the fixing member 22 is fixed to the seal case 7 while the arm 22b grips the outer circumference of the socket 7b, the seal member S1 can be easily installed by hand without using a tool if the tightening force of the arm 22b against the socket 7b is set to be smaller. In addition, since the fixing member 22 is fixed to the seal case 7 by gripping the outer circumference of the socket 7b with the arm 22b, the plate 21 can be formed into a thin annular shape, thus allowing the axial length of the seal member S1 to be shorter. In the case of the stopper 10 illustrated in FIGS. 2, 4, and 5, since cutting is required in order to provide the thin inner circumferential portion 10a1 and the thick outer circumferential portion 10a2 on the plate 10a or to provide the chamfered portion 10a4 on the outer circumference, the outer circumference of the plate 10a needs to be chucked, and thus the thickness of the plate 10a must be large to some extent. Therefore, in a case where, as in the stopper 20 of the first modification, the fixing member 22 includes the main body portion 22a that is annular and abuts on the surface of the plate 21 on the rod guide side and the six arms 22b provided on the outer circumference of the main body portion 22a and gripping the outer circumference of the socket 7b, the thickness of the plate 21 can be smaller, thus allowing the axial length of the seal member S1 to be shorter.

As in the seal member S, the seal member S1 configured as described above is assembled in advance, then incorporated in the piston rod assembly, inserted into the cylinder 1, and fixed to the cylinder 1 while being sandwiched between the crimped portion 1a and the C ring 5. Even when the piston rod assembly is assembled or inserted into the cylinder 1, the stopper 20 prevents the seal ring 8 and the seal holder 9 from falling off from the annular concave portion 7a of the seal case 7, and the seal ring 8 and the seal holder 9 are maintained in a state where they are accommodated in the annular concave portion 7a in a correct posture.

Therefore, according to the shock absorber D including the seal member S1 configured as described above, since the seal ring 8 and the seal holder 9 are maintained in the state where they are installed to the seal case 7 in the correct posture, the seal ring 8 can tighten the entire circumference of the piston rod 3 with a uniform tightening force, thus making it possible to exhibit stable sealing performance. In addition, since a structure is adopted in which the fixing member 22 is fixed to the seal case 7 by gripping the outer circumference of the socket 7b with the arm 22b, the plate 21 can be formed into a thin annular shape, thus allowing the axial length of the seal member S1 to be shorter, so that the shock absorber D including the seal member S1 can more easily secure the stroke strength.

When the seal member S1 is fixed to the cylinder 1, since the socket 7b is accommodated in the concave portion 2d on the outer circumference of the rod guide 2, the main body portion 22a of the fixing member 22 abuts on the convex portion 2c of the rod guide 2 and is fixed to the cylinder 1 while being pressed together with the plate 21 against the seal case 7 by the axial force received from the crimped portion 1a. Since the inner circumferential portion of the main body portion 22a of the fixing member 22 supported by the convex portion 2c of the rod guide 2 faces the inner circumference of the seal holder 9, the seal holder 9 can be supported by the inner circumferential portion of the fixing member 22 even if the seal holder 9 is deformed to be lifted from the seal case 7 due to the diameter enlargement of the lip 8b caused by the insertion of the piston rod 3 to the inner circumferential side. In addition, since a gap is formed between the fixing member 22 and the seal holder 9 due to the installation of the plate 21, the interference between the fixing member 22 and the lip 8b of the seal ring 8 is avoided, and an excessive tightening force is not given to the lip 8b, thus making it possible to suppress the deterioration of the seal ring 8 due to wear.

Since the fixing member 22 of the stopper 20 includes the six notches 22a1 on the inner circumference, and the plate 21 has an inner diameter equal to or larger than the diameter of the circumscribed circle C1 in contact with the distal ends of the notches 22a1 and abuts on the seal holder 9, it is possible to cause the pressure of the extension side chamber R1 to act on the seal holder 9 via the notches 22a1 even if the seal holder 9 is deformed to be lifted from the seal case 7 and abuts on the inner circumference of the fixing member 22. Therefore, it is possible to cause a high pressure in the extension side chamber R1 compressed during the extension operation of the shock absorber D to act on the seal holder 9 to increase the tightening force for tightening the piston rod 3 with the lip 8b of the seal ring 8. In addition, even if the seal holder 9 abuts on the fixing member 22 while being deformed, since the inner diameter of the fixing member 22 is larger than the outer diameter of the piston rod 3, the pressure of the extension side chamber R1 can act on the lip 8b of the seal ring 8. The number of the notches 22a1 provided in the main body portion 22a of the fixing member 22 may be one or more, and can be arbitrarily set.

Figure 8:
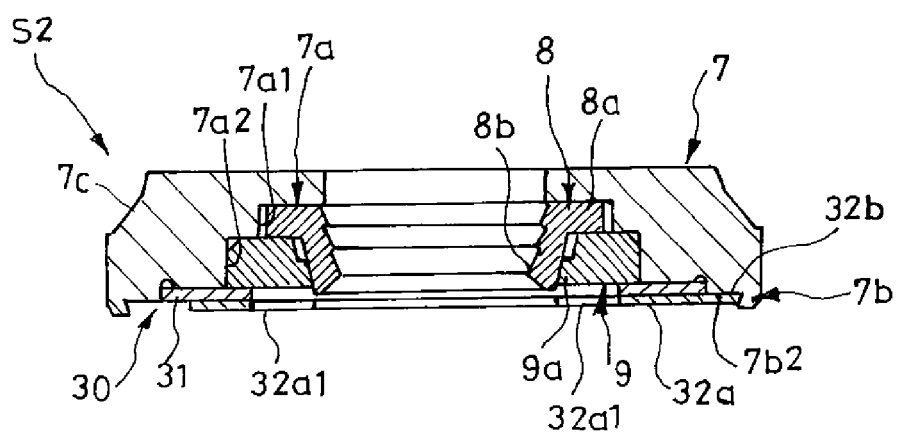
FIG. 8 is a partially enlarged longitudinal cross-sectional view of a shock absorber including a seal member having a stopper according to a second modification.
Figure 9:
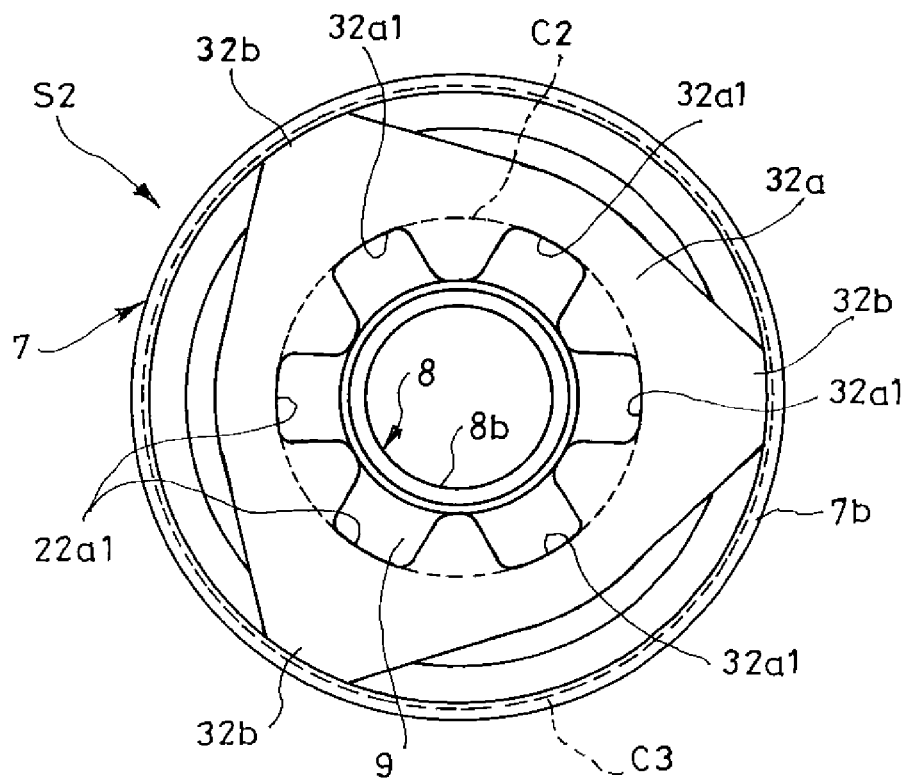
FIG. 9 is an enlarged bottom view of the shock absorber including the seal member having the stopper according to the second modification.

Next, a stopper 30 of a second modification will be described. As illustrated in FIGS. 8 and 9, a stopper 30 of the second modification includes a plate 31 that is annular, is fitted to the inner circumference of the socket 7b, abuts on the seal holder 9, and has a larger inner diameter than the outer diameter of the piston rod 3, and a fixing member 32 mounted on the socket 7b and fixing the plate 31 to the seal case 7.

The plate 31 is annular and is fitted to the inner circumference of the socket 7b. The socket 7b of the seal case 7 is annular, has an inner diameter enlarged partway, and includes a step portion 7b2 on the inner circumference; in addition, the inner circumferential surface on the opening side from the step portion 7b2 is a tapered surface in which the diameter is enlarged at the far side from the opening end, and the inner diameter of the step portion 7b2 is larger than the inner diameter of the opening end. Since the inner circumference of the socket 7b is tapered on the opening end side from the step portion 7b2, the socket 7b includes, on the inner circumference, a portion with a larger diameter than the inner diameter of the opening end.

The fixing member 32 includes a main body portion 32a that is annular and abuts on the surface of the plate 31 on the rod guide side, and three claws 32b provided on the outer circumference of the main body portion 32a and entering the large-diameter portion described above of the inner circumference of the socket 7b. The main body portion 32a has a larger inner diameter than the outer diameter of the piston rod 3, and includes six notches 32a1 opened from the inner circumference and formed toward the outer circumference. The inner diameter of the plate 31 is equal to or larger than the diameter of a circumscribed circle C2 contact with the distal ends of the notches 32a1 and smaller than the outer diameter of the seal holder 9, and the plate 31 abuts on the surface of the seal holder 9 on the rod guide side when fitted to the inner circumference of the socket 7b on the far side from the step portion 7b2.

The outer diameter of the main body portion 32a is larger than the outer diameter of the plate 31 and the minimum diameter of the inner circumference of the socket 7b, and the fixing member 32 is accommodated on the opening side from the step 7b2 of the socket 7b. The claw 32b of the fixing member 32 radially protrudes from the outer circumference of the main body portion 32a and has a tapered end. In addition, the diameter of a circumscribed circle C3 in contact with the distal ends of the claws 32b is larger than the inner diameter of the opening end of the socket 7b. Therefore, when the fixing member 32 is pushed into the socket 7b, the claw 32b is temporarily bent and then enters the socket 7b and then the claw returns from the bent state by its own restoring force, causing the fixing member 32 to be hooked on the tapered inner circumferential surface of the socket 7b and fixed to the seal case 7. The number of the claws 32b installed can be arbitrarily set as long as it is 2 or more. When three or more claws 32b are provided at equal intervals on the outer circumference of the main body portion 32a, the fixing member 32 can be fixed to the socket 7b without looseness. The large-diameter portion provided on the inner circumference of the socket 7b may be installed by providing an annular groove along the circumferential direction on the inner circumference.

The plate 31 is fixed to the seal case 7 when the fixing member 32 is mounted on the seal case 7 as described above in a state where the plate 31 is fitted to the inner circumference of the socket 7b of the seal case 7 on the far side with a small inner diameter. Since the plate 31 is fixed to the seal case 7 while abutting on the outer circumferential side of the surface of the seal holder 9 on the rod guide side, the seal ring 8 and the seal holder 9 in the annular concave portion 7a are prevented from falling off from the seal case 7.

In addition, by setting the thickness that is the axial length of the plate 31 of the stopper 30 of the second modification in the shock absorber P of the present embodiment, to be equal to or larger than the height of the step portion 7b2 of the socket 7b, the main body portion 32a of the fixing member 32 comes in close contact with the surface of the plate 31 on the rod surface side when the fixing member 32 is mounted on the socket 7b, thus allowing the plate 31 to be fixed to the seal case 7 without looseness.

In a seal member S2 configured as described above, since the portion having a larger diameter than the inner diameter of the opening end is formed as a tapered surface on the inner circumferential surface of the socket 7b on the opening end side from the step portion 7b2, and the claw 32b enters the portion to fix the fixing member 32 to the seal case 7, the seal member 32 can be easily installed by hand without using a tool if the radial length of the claw 32b is set to be shorter. In addition, since the fixing member 32 is fixed to the seal case 7 by causing the claws 32b to enter the portion having a larger diameter than the inner diameter of the opening end provided on the inner circumference of the socket 7b on the opening end side from the step portion 7b2, the plate 31 can be formed into a thin annular ring, thus allowing the axial length of the seal member S2 to be shorter, as in the seal member S1.

As in the seal members S and S1, the seal member S2 configured as described above is assembled in advance, then incorporated in the piston rod assembly, inserted into the cylinder 1, and fixed to the cylinder 1 while being sandwiched between the crimped portion 1a and the C ring 5. Even when the piston rod assembly is assembled or inserted into the cylinder 1, the stopper 30 prevents the seal ring 8 and the seal holder 9 from falling off from the annular concave portion 7a of the seal case 7, and the seal ring 8 and the seal holder 9 are maintained in a state where they are accommodated in the annular concave portion 7a in a correct posture.

Therefore, according to the shock absorber D including the seal member 52 configured as described above, since the seal ring 8 and the seal holder 9 are maintained in a state where they are installed to the seal case 7 in a correct posture, the seal ring 8 can tighten the entire circumference of the piston rod 3 with a uniform tightening force, thus making it possible to exhibit stable sealing performance. In addition, since a structure is adopted in which the fixing member 32 is fixed to the seal case 7 by causing the claws 32b to enter the portion having a larger diameter than the inner diameter of the opening end provided on the inner circumference of the socket 7b on the opening end side from the step portion 7b2, the plate 31 can be formed into a thin annular ring, thus allowing the axial length of the seal member 82 to be shorter, so that the shock absorber D including the seal member S2 can more easily secure the stroke strength.

When the seal member 82 is fixed to the cylinder 1, since the socket 7b is accommodated in the concave portion 2d on the outer circumference of the rod guide 2, the main body portion 32a of the fixing member 32 abuts on the convex portion 2c of the rod guide 2 and is fixed to the cylinder 1 while being pressed together with the plate 31 against the seal case 7 by the axial force received from the crimped portion 1a. Since the inner circumferential portion of the main body portion 32a of the fixing member 32 supported by the convex portion 2c of the rod guide 2 faces the inner circumference of the seal holder 9, the seal holder 9 can be supported by the inner circumferential portion of the fixing member 32 even if the seal holder 9 is deformed to be lifted from the seal case 7 due to the diameter enlargement of the lip 8b caused by the insertion of the piston rod 3 to the inner circumferential side. Since a gap is formed between the fixing member 32 and the seal holder 9 due to the installation of the plate 31, the interference between the fixing member 32 and the lip 8b of the seal ring 8 is avoided, and an excessive tightening force is not given to the lip 8b, thus making it possible to suppress the deterioration of the seal ring 8 due to wear.

Since the fixing member 32 of the stopper 30 includes the six notches 32a1 on the inner circumference, and the plate 31 has an inner diameter equal to or larger than the diameter of the circumscribed circle C2 in contact with the distal ends of the notches 32a1 and abuts on the seal holder 9, it is possible to cause the pressure of the extension side chamber R1 to act on the seal holder 9 via the notches 32a1 even if the seal holder 9 is deformed to be lifted from the seal case 7 and abuts on the inner circumference of the fixing member 32. Therefore, it is possible to cause a high pressure the extension side chamber R1 compressed during the extension operation of the shock absorber D to act on the seal holder 9 to increase the tightening force for tightening the piston rod 3 with the lip 8b of the seal ring 8. In addition, even if the seal holder 9 abuts on the fixing member 32 while being deformed, since the inner diameter of the fixing member 32 is larger than the outer diameter of the piston rod 3, the pressure of the extension side chamber R1 can act on the lip 8b of the seal ring 8. The number of the notches 32a1 provided in the main body portion 32a of the fixing member 32 may be one or more, and can be arbitrarily set.

Figure 10:
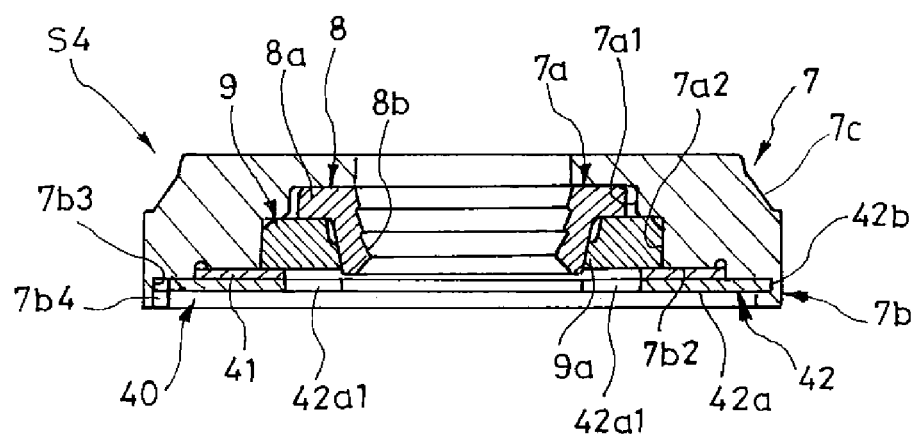
FIG. 10 is a partially enlarged longitudinal cross-sectional view of a shock absorber including a seal member having a stopper according to a third modification.
Figure 11:
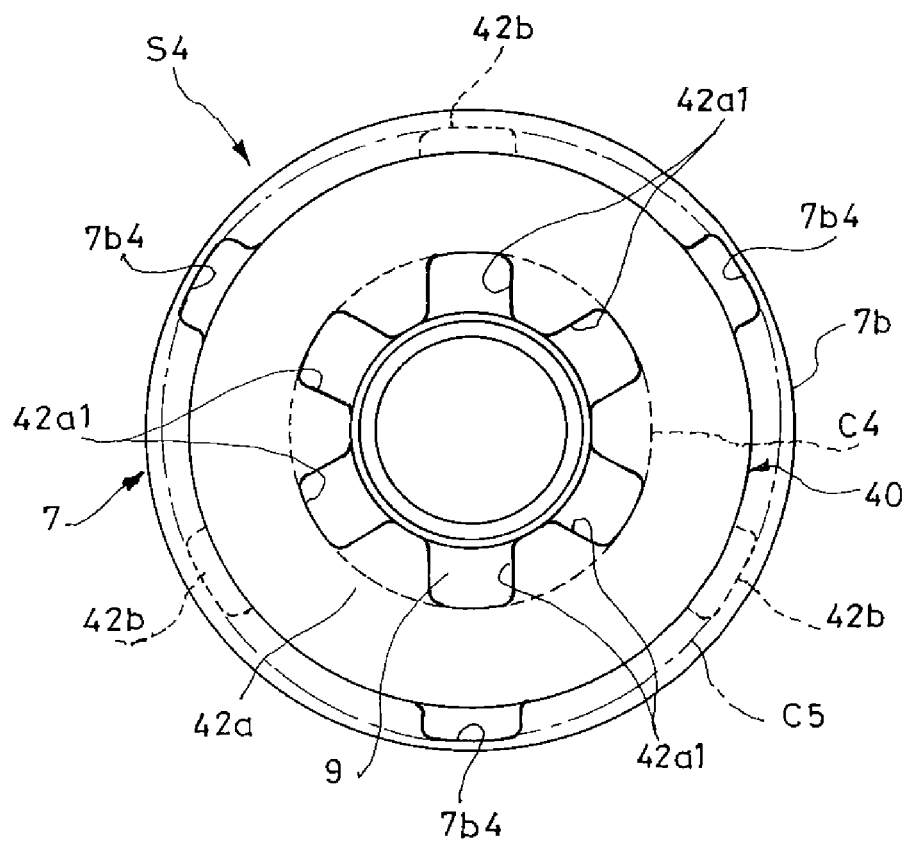
FIG. 11 is an enlarged bottom view of the shock absorber including the seal member having the stopper according to the third modification.

Next, a stopper 40 of a third modification will be described. As illustrated in FIGS. 10 and 11, a stopper 40 of the third modification includes a plate 41 that is annular, is fitted to the inner circumference of the socket 7b, abuts on the seal holder 9, and has a larger inner diameter than the outer diameter of the piston rod 3, and a fixing member 42 mounted on the socket 7b and fixing the plate 41 to the seal case 7.

The plate 41 is annular and is fitted to the inner circumference of the socket 7b. The socket 7b of the seal case 7 is annular, has an inner diameter enlarged partway, and includes a step portion 7b2 on the inner circumference; in addition, the socket 7b further includes an annular groove 7b3 formed along the circumferential direction on the inner circumference on the opening side from the step portion 7b2, and three vertical grooves 7b4 formed along the axial direction from the opening end and communicating with the annular groove 7b3.

The fixing member 42 includes a main body portion 42a that is annular and abuts on the surface of the plate 41 on the rod guide side, and three protrusions 42b provided at positions corresponding to the vertical grooves 7b4 on the outer circumference of the main body portion 42a, insertable into the vertical grooves 7b4 of the socket 7b, and fitted into the annular grooves 7b3. The main body portion 42a has a larger inner diameter than the outer diameter of the piston rod 3, and includes six notches 42a1 opened from the inner circumference and formed toward the outer circumference. The inner diameter of the plate 41 is equal to or larger than the diameter of a circumscribed circle C4 in contact with the distal ends of the notches 42a1 and smaller than the outer diameter of the seal holder 9, and the plate 41 abuts on the surface of the seal holder 9 on the rod guide side when fitted to the inner circumference of the socket 7b on the far side from the step portion 7b2.

The outer diameter of the main body portion 42a is larger than the outer diameter of the plate 41 and the minimum diameter of and the inner circumference of the socket 7b, and the fixing member 42 is accommodated on the opening side from the step portion 7b2 of the socket 7b. The protrusion 42b of the fixing member 42 has a shape corresponding to the vertical groove 7b4 formed on the inner circumference of the socket 7b when the fixing member 42 is viewed from the axial direction, and radially protrudes from the position corresponding to the vertical groove 7b4 on the outer circumference of the main body portion 42a. The same number of the protrusions 42b as the number of the vertical grooves 7b4 are provided on the outer circumference of the main body portion 42a, the number of the protrusions 42b installed may be equal to or less than the number of the vertical grooves 7b4 as long as each of the protrusions 42b of the fixing member 42 can be inserted into the vertical groove 7b4 provided in the socket 7b. In addition, the diameter of a circumscribed circle C5 in contact with the distal ends of the protrusions 42b is larger than the inner diameter of the inner circumference of the socket 7b on the opening end side from the step portion 7b2 and is equal to or smaller than the inner diameter of the annular groove 7b3.

Therefore, first, the plate 41 is fitted to the inner circumference of the socket 7b on the far side from the step portion 7b2, and then the fixing member 42 is inserted into the socket 7b in a state where each protrusion 42b faces the vertical groove 7b4 of the socket 7b in the axial direction of the seal case 7 and the fixing member 42. Then, the protrusion. 42b is inserted into the vertical groove 7b4, and the fixing member 42 abuts on the plate 41. In this state, since the protrusion 42b enters the annular groove 7b3, the protrusion 42b moves in the circumferential direction in the annular groove 7b3 when the fixing member 42 is rotated in the circumferential direction. Thus, the protrusion 42b no longer faces the vertical groove 7b4, and the fixing member 42 fixed to the socket 7b. Since the Plate 41 is fixed to the seal case 7 while abutting on the outer circumferential side of the surface of the seal holder 9 on the rod guide side, the seal ring 8 and the seal holder 9 in the annular concave portion 7a are prevented from falling off from the seal case 7.

In addition, by setting the thickness that is the axial length of the plate 41 of the stopper 40 of the third modification in the shock absorber D of the present embodiment, to be equal to or larger than the height of the step portion 7b2 of the socket 7b, the main body portion 42a of the fixing member 42 comes in close contact with the surface of the plate 41 on the rod guide side when the fixing member 42 is mounted on the socket 7b, thus allowing the plate 41 to be fixed to the seal case 7 without looseness.

In a seal member S3 configured as described above, since the protrusion 42b is caused to enter the annular groove 7b3 provided on the inner circumference of the socket 7b on the opening side from the step portion 7b2 to fix the fixing member 42 to the seal case 7, the seal member S3 can be easily installed by hand without using a tool. In addition, since the fixing member 42 is fixed to the seal case 7 by causing the protrusion 42b to enter the annular groove 7b3 provided on the inner circumference of the socket 7b on the opening side from the step portion 7b2, the plate 41 can be formed into a thin annular ring, thus allowing the axial length of the seal member S3 to be shorter, as in the seal member 31. Since the annular groove 7b3 is formed at a position separated from the deepest portion of the socket 7b to the opening side, the annular groove 7b3 can be processed without difficulty.

As in the seal members S, S1, and S2, the seal member S3 configured as described above is assembled in advance, then incorporated in the piston rod assembly, inserted into the cylinder 1, and fixed to the cylinder 1 while being sandwiched between the crimped portion as and the C ring 5. Even if vibration acts on the seal member S3 during conveyance of the piston rod assembly, the stopper 40 prevents the seal ring 8 and the seal holder 9 from falling off from the annular concave portion 7a of the seal case 7, and the seal ring 8 and the seal holder 9 are maintained in a state where they are accommodated in the annular concave portion 7a in a correct posture.

Therefore, according to the shock absorber D including the seal member S3 configured as described above, since the seal ring 8 and the seal holder 9 are maintained in the state where they are installed to the seal case 7 in the correct posture. The seal ring 8 can tighten the entire circumference of the piston rod 3 with a uniform tightening force, thus making it possible to exhibit stable sealing performance. In addition, since a structure is adopted in which the vertical groove 7b3 installed on the inner circumference of the socket 7b on the opening side from the step portion 7b2 and the vertical groove 7b4 communicating with the annular groove 7b3 are provided, and the fixing member 42 is fixed to the seal case 7 by fitting the protrusion 42b to the annular groove 7b3, the plate 31 can be formed into a thin annular ring, thus allowing the axial length of the seal member S3 to be shorter, so that the shock absorber D including the seal member S3 can more easily secure the stroke strength.

When the seal member S3 is fixed to the cylinder 1, since the socket 7b is accommodated in the concave portion 2d on the outer circumference of the rod guide 2, the main body portion 42a of the fixing member 42 abuts on the convex portion 2c of the rod guide 2 and is fixed to the cylinder 1 while being pressed together with the plate 41 against the seal case 7 by the axial force received from the crimped portion 1a. Since the inner circumferential portion of the main body portion 42a of the fixing member 42 supported by the convex portion 2c of the rod guide 2 faces the inner circumference of the seal holder 9, the seal holder 9 can be supported by the inner circumferential portion of the fixing member 42 even if the seal holder 9 is deformed to be lifted from the seal case 7 due to the diameter enlargement of the lip 8b caused by the insertion of the piston rod 3 to the inner circumferential side.

Since the fixing member 42 of the stopper 40 includes the six notches 42a1 on the inner circumference, and the plate 41 has an inner diameter equal to or larger than the diameter of the circumscribed circle C4 in contact with the distal ends of the notches 42a1 and abuts on the seal holder 9, it is possible to cause the pressure of the extension side chamber R1 to act on the seal holder 9 via the notches 42a1 even if the seal holder 9 is deformed to be lifted from the seal case 7 and abuts on the inner circumference of the fixing member 42. Therefore, it is possible to cause a high pressure in the extension side chamber R1 compressed during the extension operation of the shock absorber D to act on the seal holder 9 to increase the tightening force for tightening the piston rod 3 with the lip 8b of the seal ring 8. In addition, even if the seal holder 9 abuts on the fixing member 42 while being deformed, since the inner diameter of the fixing member 42 is larger than the outer diameter of the piston rod 3, the pressure of the extension side chamber R1 can act on the lip 8b of the seal ring 8. The number of the notches 42a1 provided in the main body portion 42a of the fixing member 42 may be one or more, and can be arbitrarily set.

In the second modification and the third modification, the socket 7b of the seal case 7 includes the step portion 7b2, and the outer diameter of the plates 31 and 41 is smaller than the main body portions 32a and 42a of the fixing members 32 and 42, respectively; however, the socket 7b may not include the step portion 7b2.

Figure 12:
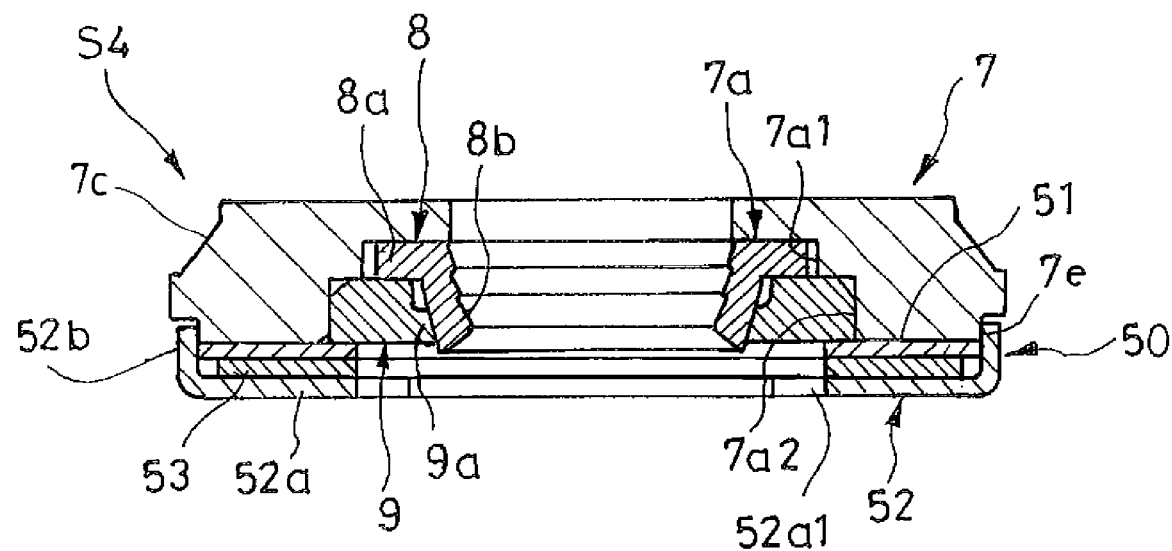
FIG. 12 as an enlarged longitudinal view of a shock absorber including a seal member having a stopper according to a fourth modification.

The stopper may be configured as in the modification illustrated below. As illustrated in FIG. 12, a stopper 50 of a fourth modification includes a plate 51 that is annular, abuts on the surface of the seal holder 9 on the rod guide side and the seal case 7, and has a larger inner diameter than the outer diameter of the piston rod 3, and a fixing member 52 gripping the outer circumference of the seal case 7 to fix the plate 51 to the seal case 7.

As illustrated in FIG. 12, the seal case 7 has a shape in which the socket 7b of the seal case 7 illustrated in FIG. 6 is eliminated, and includes an annular concave portion 7a provided on the inner circumference of the end on the rod guide 2 side that is the lower end in FIG. 12, and a small outer diameter portion 7e provided by forming the outer circumference of the lower end on the rod guide side in FIG. 12 to have a small diameter, and an annular concave portion 7c provided on the outer circumference of the upper end on the side opposite to the rod guide in FIG. 12, which is the upper end in FIG. 12.

The plate 51 is annular and includes a smaller inner diameter than the outer diameter of the seal holder 9 and an outer diameter that is larger than the outer diameter of the seal holder 9 and smaller than the outer diameter of the end of the seal case 7 on the rod guide side.

The fixing member 52 has substantially the same configuration as the fixing member 22 of the first modification illustrated in FIG. 6, and includes a main body portion 52a that is annular and faces the surface of the plate 51 on the rod guide side, and six arms 52b provided on the outer circumference of the main body portion 52a and gripping the outer circumference of the small outer diameter portion 7e of the seal case 7. The main body portion 52a has a larger inner diameter than the outer diameter of the piston rod 3, and includes six notches 52a1 opened from the inner circumference and formed toward the outer circumference. The arm 52b of the fixing member 52 has a claw shape with a bent distal end portion when the fixing member 52 is viewed from the side, and tightens the outer circumference of the small outer diameter portion 7e to grip the seal case 7 when fitted to the outer circumference of the small outer diameter portion 7e.

The inner diameter of the plate 51 is equal to or larger than the diameter of the circumscribed circle in contact with the distal ends of the notches 52a1 and smaller than the outer diameter of the seal holder 9, and the outer diameter of the plate 51 is set so as to be fitted to the inner surface of the arm 52b of the fixing member 52. The stopper 50 of the present embodiment includes a washer 53 interposed between the plate 51 and the fixing member 52. The washer 53 has an inner diameter substantially equal to the inner diameter of the plate 51. The outer diameter of the washer 53 is smaller than the outer diameter of the plate 50. Furthermore, the length from the distal end of the arm 52b to the main body portion 52a in the vertical direction in FIG. 12' is longer than the axial length when the plate 51 and the washer 53 are stacked.

Therefore, when the fixing member 52 is mounted on the seal case 7 by placing the plate 51 on the base 9a of the seal holder 9 and the seal case 7, placing the washer 53 on the rod guide side of the plate 51, and gripping the outer circumference of the small outer diameter portion 7d with the arm 52b, the seal ring 8, the seal holder 9, the plate 51, and the washer 53 are sandwiched and fixed between the fixing member 52 and the seal case 7.

Since the plate 51 is fitted to the inner surface of the arm 52b of the fixing member 52, the plate 51 is aligned by the fixing member 52 and fixed to the seal case 7. Since the outer diameter of the washer 53 is set so as not to contact the inner surface of the arm 52b, the washer 53 avoids the curved portion of the boundary between the arm 52b and the main body portion 52a, and thus the main body portion 52a of the fixing member 52 abuts on the washer 53 without being lifted, making it possible to secure the seal ring 8, the seal holder 9, the plate 51, and the washer 53 to the seal case 7. The washer 53 is interposed to receive the axial force received from the crimped portion 1a against the seal case 7 by the main body portion 52a of the fixing member 52 that abuts on the convex portion 2c of the rod guide 2 when a seal member S4 is fixed to the cylinder 1; however, the washer can be omitted when the plate 51 and the fixing member 52 sufficiently receive the axial force.

When the fixing member 52 is mounted on the seal case 7 as described above in a state where the plate 51 is stacked on seal case 7, the plate 51 is fixed to the seal case 7. Since the plate 51 is fixed to the seal case 7 while abutting on the outer circumferential side of the surface of the seal holder 9 on the rod guide side, the seal ring 8 and the seal holder 9 in the annular concave portion 7a are prevented from falling off from the seal case 7.

In addition, in the stopper 50 in the fourth modification of the shock absorber D of the present embodiment, since it is not necessary to provide the socket 7b in the seal case 7, the fixing member 52 is fixed to the seal case 7 by gripping the outer circumference of the seal case 7, the plate 51 can be sandwiched between the fixing member 52 and the seal case 7, thus allowing the plate 51 to come in close contact with the surface of the seal case 7 on the rod guide side and to be fixed to the seal case 7 without looseness.

In the seal member S4 configured as described above, since the fixing member 52 is fixed to the seal case 7 by gripping the outer circumference of the seal case 7, the seal member S4 can be easily installed by hand without using a tool if the tightening force of the arm 52b is set to be smaller. In addition, since the fixing member 52 is fixed to the seal case 7 by gripping the outer circumference of the seal case 7, the plate 51 can be formed into a thin annular shape, thus allowing the axial length of the seal member S4 to be shorter.

As in the seal member S, the seal member S4 configured as described above is assembled in advance, then incorporated in the piston rod assembly, inserted into the cylinder 1, and fixed to the cylinder 1 while being sandwiched between the crimped portion 1a and the C ring 5. Even when the piston rod assembly is assembled or inserted into the cylinder 1, the stopper 50 prevents the seal ring 8 and the seal holder 9 from falling off from the annular concave portion 7a of the seal case 7, and the seal ring 8 and the seal holder 9 are maintained in a state where they are accommodated in the annular concave portion 7a in a correct posture.

Therefore, according to the shock absorber D including the seal member S4 configured as described above, since the seal ring 8 and the seal holder 9 are maintained in a state where they are installed to the seal case 7 in a correct posture, the seal ring 8 can tighten the entire circumference of the piston rod 3 with a uniform tightening force, thus making it possible to exhibit stable sealing performance. In addition, since a structure is adopted in which the fixing member 52 is fixed to the seal case 7 by gripping the outer circumference of the seal case 7, the plate 51 can be formed into a thin annular shape, thus allowing the axial length of the seal member S4 to be shorter, so that the shock absorber D including the seal member S4 can more easily secure the stroke strength.

When the seal member S4 is fixed to the cylinder 1, the main body portion 52a of the fixing member 52 abuts on the convex portion 2c of the rod guide 2 and is fixed to the cylinder 1 while being pressed together with the plate 51 against the seal case 7 by the axial force received from the crimped portion 1a. Since the inner circumferential portion of the main body portion 52a of the fixing member 52 supported by the convex portion 2c of the rod guide 2 faces the inner circumference of the seal holder 9, the seal holder 9 can be supported by the inner circumferential portion of the fixing member 52 even if the seal holder 9 is deformed to be lifted from the seal case 7 due to the diameter enlargement of the lip 8b caused by the insertion of the piston rod 3 to the inner circumferential side. Since a gap is formed between the fixing member 52 and the seal holder 9 due to the installation of the plate 51, the interference between the fixing member 52 and the lip 8b of the seal ring 8 is avoided, and an excessive tightening force is not given to the lip 8b, thus making it possible to suppress the deterioration of the seal ring 8 due to wear.

Since the fixing member 52 of the stopper 50 includes the six notches 52a1 on the inner circumference, and the plate 51 has an inner diameter equal to or larger than the diameter of the circumscribed circle in contact with the distal ends of the notches 52a1 and abuts on the seal holder 9, it is possible to cause the pressure of the extension side chamber R1 to act on the seal holder 9 via the notches 52a1 even if the seal holder 9 is deformed to be lifted from the seal case 7 and abuts on the inner circumference of the fixing member 52. Therefore, it is possible to cause a high pressure in the extension side chamber R1 compressed during the extension operation of the shock absorber D to act on the seal holder 9 to increase the tightening force for tightening the piston rod 3 with the lip 8b of the seal ring 8. In addition, even if the seal holder 9 abuts on the fixing member 52 while being deformed, since the inner diameter of the fixing member 52 is larger than the outer diameter of the piston rod 3, the pressure of the extension side chamber R1 can act on the lip 8b of the seal ring 8. The number of the notches 52a1 provided in the main body portion 52a of the fixing member 52 may be one or more, and can be arbitrarily set.

Although the preferred embodiment of the present invention has been described above in detail, modifications, variations, and changes are still possible without departing from the scope of the claims.

The invention claimed is:

1. A shock absorber comprising:
a cylinder;
an annular rod guide fitted to an inner circumference of an end portion of the cylinder;
a piston rod inserted through an inner circumference of the rod guide and movably inserted into the cylinder;
a piston connected to the piston rod and inserted into the cylinder to partition an inside of the cylinder into an extension side chamber and a compression side chamber that are filled with a working fluid; and
a seal member that is annular, is stacked on a side of the rod guide opposite to the piston, is fitted to the inner circumference of the end portion of the cylinder, and has an inner circumference through which the piston rod is inserted,
wherein the seal member includes:
an annular seal case having an annular concave portion on an inner circumference on a rod guide side;
a seal ring having an annular base portion and an annular lip rising from an inner circumference of the base portion toward the rod guide side and slidably contacting an outer circumference of the piston rod, and accommodated in the annular concave portion;
an annular seal holder stacked on the rod guide side of the base portion of the seal ring, accommodated in the annular concave portion, and supporting an outer circumference of the lip to suppress diameter enlargement of the lip; and
a stopper sandwiched between the rod guide and the seal case, and mounted on the seal case and abutting on a surface of the seal holder on the rod guide side to prevent the seal holder and the seal ring from falling off.

2. The shock absorber according to claim 1, wherein the seal case has an annular socket on a radially inwardly facing surface of an outer circumferential portion of the seal case, and
the stopper includes a plate that is annular, is fitted to an inner circumference of the socket, abuts on the seal holder, and has a larger inner diameter than an outer diameter of the piston rod, and a fixing member that is mounted on the socket and fixes the plate to the seal case.

3. The shock absorber according to claim 2, wherein the plate includes:
an inner circumferential portion facing the seal holder and forming an annular gap with the seal holder;
an outer circumferential portion connected to an outer circumference of the inner circumferential portion, abutting on the seal holder, and fitted to an inner circumference of the socket;
one or more through holes penetrating the inner circumferential portion; and
a chamfered portion provided on an outer circumference of the outer circumferential portion on the rod guide side.

4. The shock absorber according to claim 1, wherein the rod guide abuts on the stopper and is spaced apart from the seal case.

5. A shock absorber comprising:
a cylinder;
an annular rod guide fitted to an inner circumference of an end portion of the cylinder;
a piston rod inserted through an inner circumference of the rod guide and movably inserted into the cylinder;
a piston connected to the piston rod and inserted into the cylinder to partition an inside of the cylinder into an extension side chamber and a compression side chamber that are filled with a working fluid; and
a seal member that is annular, is stacked on a side of the rod guide opposite to the piston, is fitted to the inner circumference of the end portion of the cylinder, and has an inner circumference through which the piston rod is inserted,
wherein the seal member includes:
an annular seal case having an annular concave portion on an inner circumference on a rod guide side and an annular socket on a radially inwardly facing surface of an outer circumferential portion of the seal case;
a seal ring having an annular base portion and an annular lip rising from an inner circumference of the base portion toward the rod guide side and slidably contacting an outer circumference of the piston rod, and accommodated in the annular concave portion;
an annular seal holder stacked on the rod guide side of the base portion of the seal ring, accommodated in the annular concave portion, and supporting an outer circumference of the lip to suppress diameter enlargement of the lip; and
a stopper mounted on the seal case and abutting on a surface of the seal holder on the rod guide side to prevent the seal holder and the seal ring from falling off,
wherein the stopper includes a plate that is annular, is fitted to an inner circumference of the socket, abuts on the seal holder, and has a larger inner diameter than an outer diameter of the piston rod, and a fixing member that is mounted on the socket and fixes the plate to the seal case, and
wherein the fixing member includes:
a main body portion that is annular, and abuts on a surface of the plate on the rod guide side; and
three or more arms provided on an outer circumference of the main body portion and gripping an outer circumference of the socket,
the main body portion having a larger inner diameter than the outer diameter of the piston rod and including one or more notches opened from an inner circumference toward an outer circumference, and the plate having an inner diameter equal to or larger than a diameter of a circumscribed circle in contact with distal ends of the notches.

6. A shock absorber comprising:

a cylinder;

an annular rod guide fitted to an inner circumference of an end portion of the cylinder;

a piston rod inserted through an inner circumference of the rod guide and movably inserted into the cylinder;

a piston connected to the piston rod and inserted into the cylinder to partition an inside of the cylinder into an extension side chamber and a compression side chamber that are filled with a working fluid; and a seal member that is annular, is stacked on a side of the rod guide opposite to the piston, is fitted to the inner circumference of the end portion of the cylinder, and has an inner circumference through which the piston rod is inserted, wherein the seal member includes:
 an annular seal case having an annular concave portion on an inner circumference on a rod guide side and an annular socket on a radially inwardly facing surface of an outer circumferential portion of the seal case;
 a seal ring having an annular base portion and an annular lip rising from an inner circumference of the base portion toward the rod guide side and slidably contacting an outer circumference of the piston rod, and accommodated in the annular concave portion;
 an annular seal holder stacked on the rod guide side of the base portion of the seal ring, accommodated in the annular concave portion, and supporting an outer circumference of the lip to suppress diameter enlargement of the lip; and
 a stopper mounted on the seal case and abutting on a surface of the seal holder on the rod guide side to prevent the seal holder and the seal ring from falling off, wherein the stopper includes a plate that is annular, is fitted to an inner circumference of the socket, abuts on the seal holder, and has a larger inner diameter than an outer diameter of the piston rod, and a fixing member that is mounted on the socket and fixes the plate to the seal case, the socket having a portion having a larger diameter than an inner diameter at an opening end on an inner circumference, and wherein the fixing member includes:
 a main body portion that is annular and abuts on a surface of the plate on the rod guide side; and
 a plurality of claws provided on an outer circumference of the main body portion and entering the large-diameter portion of the socket,
 the main body portion having a larger inner diameter than the outer diameter of the piston rod and including one or more notches opened from an inner circumference toward an outer circumference, and
 the plate having an inner diameter equal to or larger than a diameter of a circumscribed circle in contact with distal ends of the notches.

7. A shock absorber comprising:

a cylinder;

an annular rod guide fitted to an inner circumference of an end portion of the cylinder;

a piston rod inserted through an inner circumference of the rod guide and movably inserted into the cylinder;

a piston connected to the piston rod and inserted into the cylinder to partition an inside of the cylinder into an extension side chamber and a compression side chamber that are filled with a working fluid; and a seal member that is annular, is stacked on a side of the rod guide opposite to the piston, is fitted to the inner circumference of the end portion of the cylinder, and has an inner circumference through which the piston rod is inserted, wherein the seal member includes:
 an annular seal case having an annular concave portion on an inner circumference on a rod guide side and an annular socket on a radially inwardly facing surface of an outer circumferential portion of the seal case;
 a seal ring having an annular base portion and an annular lip rising from an inner circumference of the base portion toward the rod guide side and slidably contacting an outer circumference of the piston rod, and accommodated in the annular concave portion;
 an annular seal holder stacked on the rod guide side of the base portion of the seal ring, accommodated in the annular concave portion, and supporting an outer circumference of the lip to suppress diameter enlargement of the lip; and
 a stopper mounted on the seal case and abutting on a surface of the seal holder on the rod guide side to prevent the seal holder and the seal ring from falling off, wherein the stopper includes a plate that is annular, is fitted to an inner circumference of the socket, abuts on the seal holder, and has a larger inner diameter than an outer diameter of the piston rod, and a fixing member that is mounted on the socket and fixes the plate to the seal case, the socket having an annular groove provided on an inner circumference and at least one or more vertical grooves formed on the inner circumference from an opening end along an axial direction and communicating with the annular groove, and wherein the fixing member includes:
 a main body portion that is annular and abuts on a surface of the plate on the rod guide side; and
 one or more protrusions provided at positions corresponding to the vertical grooves on an outer circumference of the main body portion, insertable into the vertical groove of the socket, and fitted into the annular groove,
 the main body portion having a larger inner diameter than the outer diameter of the piston rod and including a plurality of notches opened from an inner circumference toward an outer circumference, and
 the plate having an inner diameter equal to or larger than a diameter of a circumscribed circle in contact with distal ends of the notches.

8. A shock absorber comprising:

a cylinder;

an annular rod guide fitted to an inner circumference of an end portion of the cylinder;

a piston rod inserted through an inner circumference of the rod guide and movably inserted into the cylinder;

a piston connected to the piston rod and inserted into the cylinder to partition an inside of the cylinder into an extension side chamber and a compression side chamber that are filled with a working fluid; and a seal member that is annular, is stacked on a side of the rod guide opposite to the piston, is fitted to the inner circumference of the end portion of the cylinder, and has an inner circumference through which the piston rod is inserted, wherein the seal member includes:
- an annular seal case having an annular concave portion on an inner circumference on a rod guide side;
- a seal ring having an annular base portion and an annular lip rising from an inner circumference of the base portion toward the rod guide side and slidably contacting an outer circumference of the piston rod, and accommodated in the annular concave portion;
- an annular seal holder stacked on the rod guide side of the base portion of the seal ring, accommodated in the annular concave portion, and supporting an outer circumference of the lip to suppress diameter enlargement of the lip; and
- a stopper mounted on the seal case and abutting on a surface of the seal holder on the rod guide side to prevent the seal holder and the seal ring from falling off, and wherein the stopper includes a plate that is annular, abuts on a surface of the seal holder on the rod guide side and the seal case, and has a larger inner diameter than an outer diameter of the piston rod, and a fixing member that grips an outer circumference of the seal case to fix the plate to the seal case.

* * * * *